US010482055B2

(12) United States Patent
Mishra et al.

(10) Patent No.: US 10,482,055 B2
(45) Date of Patent: Nov. 19, 2019

(54) HARDWARE EVENT PRIORITY SENSITIVE PROGRAMMABLE TRANSMIT WAIT-WINDOW FOR VIRTUAL GPIO FINITE STATE MACHINE

(71) Applicant: QUALCOMM Incorporated, San Diego, CA (US)

(72) Inventors: Lalan Jee Mishra, San Diego, CA (US); Richard Dominic Wietfeldt, San Diego, CA (US); Mohit Kishore Prasad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/974,204

(22) Filed: May 8, 2018

(65) Prior Publication Data

US 2018/0329857 A1 Nov. 15, 2018

Related U.S. Application Data

(60) Provisional application No. 62/504,427, filed on May 10, 2017.

(51) Int. Cl.
*G06F 13/42* (2006.01)
*G06F 13/40* (2006.01)

(52) U.S. Cl.
CPC ...... *G06F 13/4282* (2013.01); *G06F 13/4068* (2013.01); *G06F 2213/0016* (2013.01)

(58) Field of Classification Search
CPC ............... G06F 13/4282; G06F 13/385; G06F 13/4068; G06F 3/00; G06F 15/17; G06F 9/4498; G06F 13/38; G05B 19/054
See application file for complete search history.

(56) References Cited

U.S. PATENT DOCUMENTS

| 7,526,593 | B2 | 4/2009 | Mandal et al. |
| 9,417,801 | B2 | 8/2016 | Adams et al. |
| 2014/0088911 | A1 | 3/2014 | Rabinovich et al. |

(Continued)

FOREIGN PATENT DOCUMENTS

WO WO-2016040884 A1 3/2016

OTHER PUBLICATIONS

International Search Report and Written Opinion—PCT/US2018/031799—ISA/EPO—Sep. 3, 2018.

*Primary Examiner* — Idriss N Alrobaye
*Assistant Examiner* — Richard B Franklin
(74) *Attorney, Agent, or Firm* — Loza & Loza LLP

(57) ABSTRACT

Systems, apparatus, methods and techniques that can provide optimized low-latency communications between different devices such that GPIO signals may be carried as virtual signals. A virtual GPIO finite state machine in a first device is provided that can consolidate GPIO-related events by initiating a wait period after a first-occurring event and that has a duration selected to permit one or more later-occurring events to be detected before transmission of virtual GPIO data over a data communication bus to a second device. One method may include initiating a wait period after detecting a first change in GPIO state, refraining from transmitting virtual GPIO data during the wait period, detecting occurrence of a second change in GPIO state during the wait period, and transmitting virtual GPIO data corresponding to the first and second changes in GPIO state over the serial bus after the wait period has expired.

30 Claims, 19 Drawing Sheets

(56) References Cited

U.S. PATENT DOCUMENTS

| | | |
|---|---|---|
| 2015/0301979 A1 | 10/2015 | Mishra et al. |
| 2017/0075852 A1 | 3/2017 | Mishra et al. |
| 2017/0168966 A1 | 6/2017 | Mishra et al. |

HARDWARE EVENT PRIORITY SENSITIVE PROGRAMMABLE TRANSMIT WAIT-WINDOW FOR VIRTUAL GPIO FINITE STATE MACHINE

PRIORITY CLAIM

This application claims priority to and the benefit of U.S. Provisional Patent Application Ser. No. 62/504,427 filed in the U.S. Patent Office on May 10, 2017, the entire content of this application being incorporated herein by reference as if fully set forth below in its entirety and for all applicable purposes.

TECHNICAL FIELD

The present disclosure relates generally to serial communication and input/output pin configuration and, more particularly, to reducing event latency for communication of high-priority messages, including messages carrying virtual input/output state information.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bur or a parallel bus. General-purpose serial interfaces known in the industry, including the Inter-Integrated Circuit (I2C or I²C) serial bus and its derivatives and alternatives, including interfaces and protocols defined by the Mobile Industry Processor Interface (MIPI) Alliance, such as I3C, system power management interface (SPMI), and the Radio Frequency Front-End (RFFE) interfaces and protocols.

In one example, the I2C serial bus is a serial single-ended computer bus that was intended for use in connecting low-speed peripherals to a processor. Some interfaces provide multi-master buses in which two or more devices can serve as a bus master for different messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links.

In many instances, a number of command and control signals are employed to connect different components in mobile communication devices. These connections consume precious general-purpose input/output (GPIO) pins within the mobile communication devices and it would be desirable to replace the physical interconnects with signals carried in information transmitted over existing serial data links. However, serial data links may be associated with latencies that can prevent conversion of physical command and control signals to virtual signals, particularly in real-time embedded system applications supported by mobile communication devices that define firm transmission deadlines.

As mobile communication devices continue to include a greater level of functionality, improved serial communication techniques are needed to support low-latency transmissions between peripherals and application processors.

SUMMARY

Certain aspects of the disclosure relate to systems, apparatus, methods and techniques that can provide optimized low-latency communications between different devices such that GPIO signals may be carried as virtual signals. A virtual GPIO (VGI or VGPIO) finite state machine (VGI FSM) in a first device is provided that can consolidate GPIO-related events by initiating a wait period after a first-occurring event and that has a duration selected to permit one or more later-occurring events to be detected before transmission of VGPIO data over a data communication bus to a second device.

In various aspects of the disclosure, a method performed at a device coupled to a communication link includes detecting occurrence of a first event corresponding to a change in GPIO state, initiating a wait period when occurrence of the first event is detected, refraining from transmitting VGPIO data corresponding to the first event during the wait period, detecting occurrence of a second event corresponding to a different change in GPIO state, the second event occurring during the wait period and after the first event, and transmitting VGPIO data corresponding to the first event and the second event over the communication link after the wait period has expired.

In one aspect, the device may terminate the wait period when occurrence of the second event is detected. The VGPIO data corresponding to the first event and the second event may be transmitted over the communication link after the wait period is terminated.

In one aspect, the device may refrain from transmitting the VGPIO data when it foregoes an opportunity to transmit the VGPIO data during the wait period. The communication link may be idle during at least a portion of the wait period.

In certain aspects, the wait period is defined by a counter, and the method includes causing the counter to load a first delay value when the first event is detected. The wait period may be initiated when the counter is loaded with the first delay value. The method may include causing the counter to load a second delay value when the second event is detected. The wait period may be restarted when the counter is loaded with the second delay value. In some examples, the first delay value equals the second delay value. In other examples, the first delay value is different from the second delay value. The first delay value may be selected based on identity of a first VGPIO bit associated with the change in state of a physical GPIO pin that generated the first event, and the second delay value may be selected based on identity of a second VGPIO bit associated with the change in state of a physical GPIO pin that generated the second event. The value of each of the first delay value and the second delay value may reflect relative priority assigned to corresponding physical GPIO pins. In one example, the second delay value may cause the wait period to be terminated immediately when the second delay value is loaded.

In one aspect, the method includes detecting occurrence of a third event corresponding to a different change in GPIO state, the third event occurring during the wait period and after the second event, and transmitting VGPIO data corresponding to the third event with the VGPIO data corresponding to the first event and the second event after the wait period has expired.

In one aspect, the method includes terminating the wait period after a maximum duration has expired. The maximum period may commence when occurrence of the first event is detected.

In one aspect, the communication link includes a serial bus operated in accordance with an I3C, SPMI, or RFFE protocol. In another example, the communication link includes a peer-to-peer VGPIO messaging interface.

In various aspects of the disclosure, a device coupled to a communication link has a physical layer circuit that couples the device to the communication link, a finite state machine and a timing circuit. The finite state machine may be configured to detect occurrence of a first event corresponding to a change in general purpose input/output (GPIO) state, and a second event corresponding to a different change in GPIO state, the second event occurring after the first event. The timing circuit may be configured to initiate a wait period when occurrence of the first event is detected. The finite state machine may be further configured to constrain the physical layer circuit from transmitting virtual GPIO data corresponding to the first event during the wait period, cause the physical layer circuit to transmit the virtual GPIO data corresponding to the first event, and cause the physical layer circuit to transmit virtual GPIO data corresponding to the second event over the communication link after the wait period has expired when the second event occurs during the wait period.

In one aspect, the finite state machine is configured to forego an opportunity to transmit the virtual GPIO data during the wait period.

In some aspects, the finite state machine and/or the timing circuit is configured to terminate the wait period when occurrence of the second event is detected. The virtual GPIO data corresponding to the first event and the second event may be transmitted over the communication link after the wait period is terminated.

In certain aspects, the wait period is defined by a counter and the timing circuit is configured to cause the counter to load a first delay value when the first event is detected, and cause the counter to load a second delay value when the second event is detected. The wait period may be initiated when the counter is loaded with the first delay value. The wait period may be restarted when the counter is loaded with the second delay value. The first delay value may be equal to the second delay value. The first delay value may be different from the second delay value. The timing circuit may be configured to select the first delay value based on identity of a first VGPIO bit associated with the change in state of a physical GPIO pin that generated the first event, and select the second delay value based on identity of a second VGPIO bit associated with the change in state of a physical GPIO pin that generated the second event. The values selected as the first delay value and the second delay value reflect relative priorities assigned to corresponding physical GPIO pins. The second delay value may cause the wait period to be terminated when the second delay value is loaded.

In one aspect, the timing circuit is configured to terminate the wait period after a maximum duration has expired, the maximum period commencing when occurrence of the first event is detected.

In one or more aspects, the communication link includes a serial bus operated in accordance with an I3C, SPMI, or RFFE protocol. The communication link may include a peer-to-peer virtual GPIO messaging interface.

In various aspects of the disclosure, a device coupled to a communication link includes means for detecting events configured to detect occurrence of a first event corresponding to a change in GPIO state and a second event corresponding to a different change in GPIO state, the second event occurring after the first event. The device may include means for providing a wait period configured to initiate the wait period when occurrence of the first event is detected. The second event may occur during the wait period. The device may include means for transmitting data over the communication link. The means for transmitting data may be configured to refrain from transmitting VGPIO data corresponding to the first event during the wait period, and to transmit VGPIO data corresponding to the first event and the second event over the communication link after the wait period has expired.

In one aspect, the wait period may be terminated when occurrence of the second event is detected. The VGPIO data corresponding to the first event and the second event may be transmitted over the communication link after the wait period is terminated.

In one aspect, the means for transmitting data over the communication link is configured to forego an opportunity to transmit the VGPIO data during the wait period. The communication link may be idle during at least a portion of the wait period.

In certain aspects, the means for providing a wait period includes a counter. The means for providing a wait period may be configured to cause the counter to load a first delay value when the first event is detected. The wait period may be initiated when the counter is loaded with the first delay value. The means for providing a wait period may be configured to cause the counter to load a second delay value when the second event is detected. The wait period may be restarted when the counter is loaded with the second delay value. In one example, the first delay value equals the second delay value. In another example, the first delay value is different from the second delay value. The means for providing a wait period may be configured to select the first delay value based on identity of a first VGPIO bit associated with the change in state of a physical GPIO pin that generated the first event, and select the second delay value based on identity of a second VGPIO bit associated with the change in state of a physical GPIO pin that generated the second event. The values selected as the first delay value and the second delay value reflect relative priorities assigned to corresponding physical GPIO pins. The second delay value may cause the wait period to be terminated when the second delay value is loaded.

In one aspect, the means for providing a wait period may be configured to terminate the wait period after a maximum duration has expired, the maximum period commencing when occurrence of the first event is detected.

In one example, the communication link includes a serial bus operated in accordance with an I3C, SPMI, or RFFE protocol. In another example, the communication link includes a peer-to-peer VGPIO messaging interface.

In various aspects of the disclosure, a processor readable storage medium is disclosed. The storage medium may be a non-transitory storage medium and may store code that, when executed by one or more processors, causes the one or more processors to detect occurrence of a first event corresponding to a change in physical GPIO state, initiate a wait period when occurrence of the first event is detected, refraining from transmitting VGPIO data corresponding to the first event during the wait period, detect occurrence of a second event corresponding to a different change in physical GPIO state, the second event occurring during the wait period and after the first event, and transmit VGPIO data corresponding to the first event and the second event over the serial bus after the wait period has expired.

In one aspect, the instructions cause the one or more processors to terminate the wait period when occurrence of the second event is detected. The VGPIO data corresponding to the first event and the second event may be transmitted over the communication link after the wait period is terminated.

In one aspect, the instructions cause the one or more processors to load a first delay value into the counter when the first event is detected. The wait period may be initiated when the counter is loaded with the first delay value. The instructions may cause the one or more processors to load a second delay value into the counter when the second event is detected. The wait period may be restarted when the counter is loaded with the second delay value. In one example, the first delay value equals the second delay value. In another example, the first delay value is different from the second delay value.

DETAILED DESCRIPTION

Figure 1:
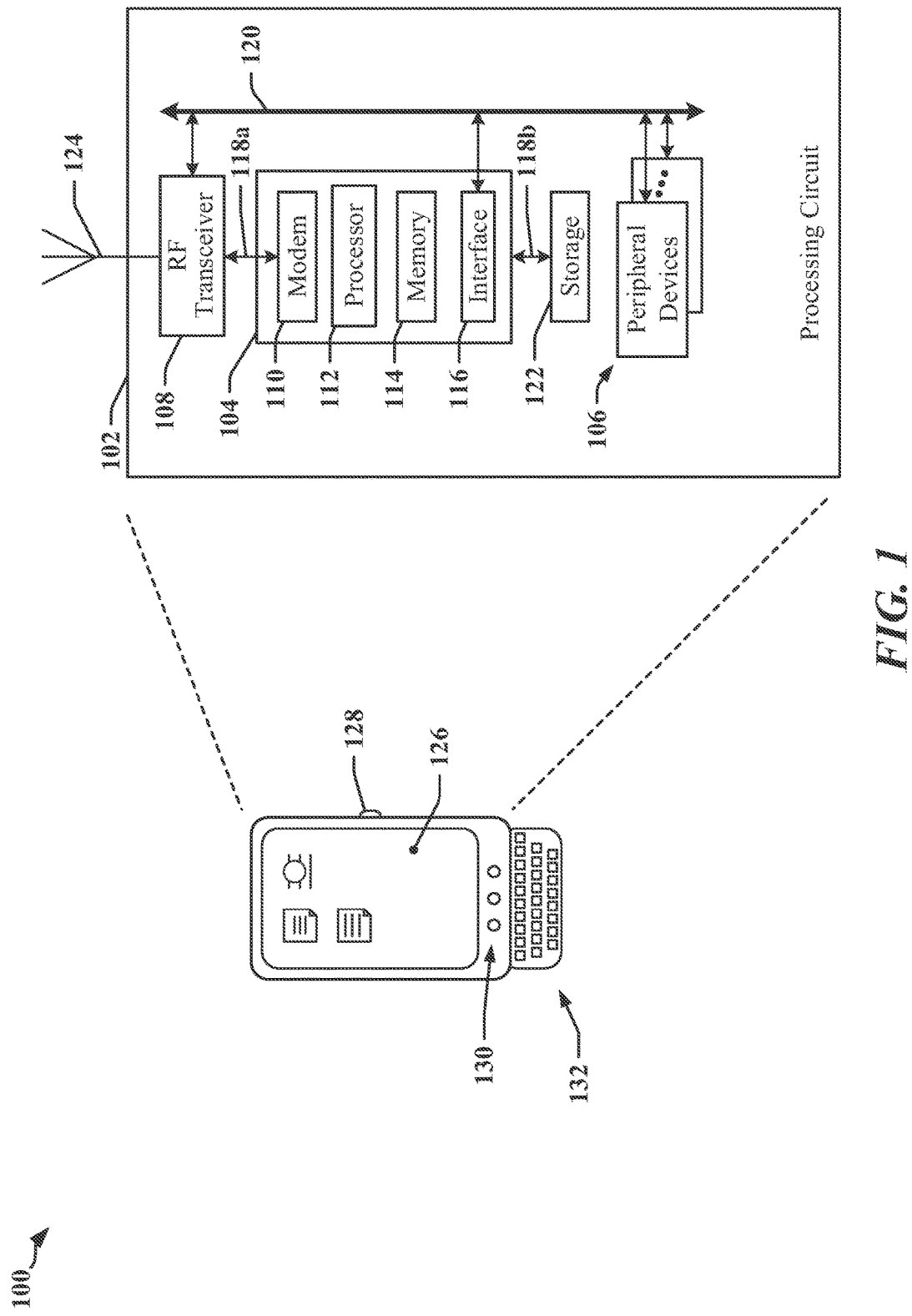
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link adapted or configured to connect processors with modems and other peripherals. The serial bus or other data communication link may be operated in accordance with one or more communication standards or protocols. In one example, a serial bus may be operated in accordance with I2C, I3C, SPMI and/or RFFE protocols. According to certain aspects disclosed herein, the signaling state of a GPIO pin, trace, connector or terminal may be virtualized into VGPIO state information that may be transmitted over a data communication link.

VGPIO state information may be transmitted over a variety of types of communication link, including communication links that include, wired links, wireless links and/or combinations of wired and wireless links In one example, VGPIO state information can be packetized or otherwise formatted for transmission over wireless networks including Bluetooth, Wireless LAN, cellular networks, etc. Examples involving wired communication links are described herein to facilitate understanding of certain aspects. These aspects invariably apply to implementations in which transmission of VGPIO state information includes transmission over radio frequency (RF) networks.

A number of different protocol schemes may be used for communicating messaging and data over communication links Existing protocols have well-defined and immutable structures in the sense that their structures cannot be changed to optimize transmission latencies based on variations in use cases, and/or coexistence with other protocols, devices and applications. It is an imperative of real-time embedded systems that certain deadlines must be met. In certain real-time applications, paramount importance may be placed on meeting transmission deadlines. In one example, it can be difficult or impossible to guarantee optimal latency under all use cases when a common bus supports different protocols. In some examples, an I2C, I3C, SPMI or RFFE serial communication bus may be used to tunnel different protocols with different latency requirements, different data transmission volumes and/or different transmission schedules.

Certain aspects disclosed herein provide methods, circuits and systems that are adapted to enable a device to consolidate VGPIO state information for multiple physical GPIO pins, including pins in interfaces connecting the device and to one or more other devices. The consolidated VGPIO state information can be addressed to specific devices or interfaces on other devices, and/or to groups of devices and/or interfaces.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include some combination of instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
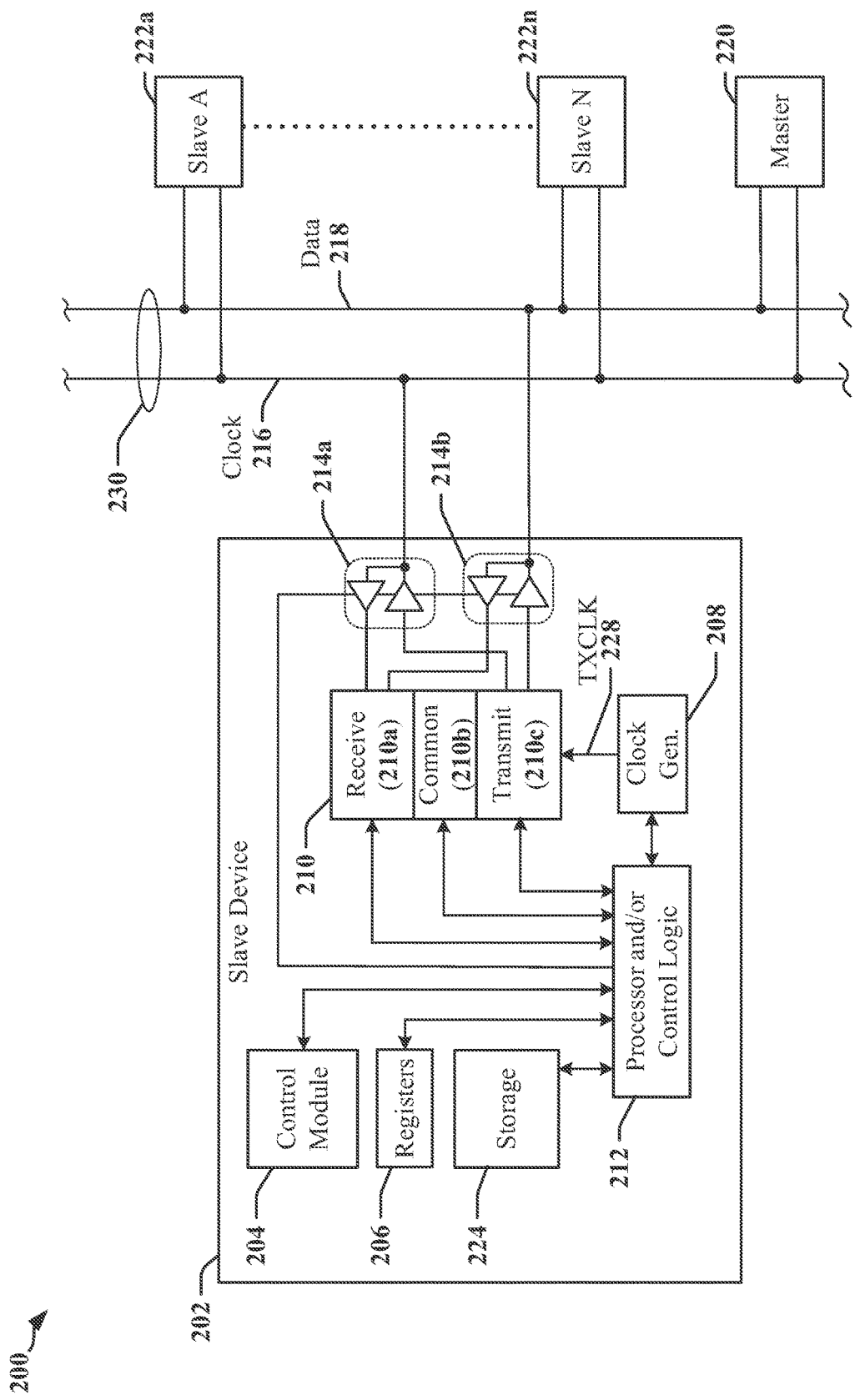
FIG. 2 illustrates a system architecture for an apparatus employing a data link between IC devices.

FIG. 2 illustrates certain aspects of an apparatus 200 that includes multiple devices 202, 220 and 222a-222n connected to a serial bus 230. The serial bus 230 may be operated in accordance with a protocol such as an I2C, I3C, SPMI, and/or RFFE, protocol. The devices 202, 220 and 222a-222n may include one or more semiconductor IC devices, such as an applications processor, SoC or ASIC. Each of the devices 202, 220 and 222a-222n may include, support or operate as a modem, a signal processing device, a display driver, a camera, a user interface, a sensor, a sensor controller, a media player, a transceiver, and/or other such components or devices. Communications between devices 202, 220 and 222a-222n over the serial bus 230 is controlled by a bus master 220. Certain types of bus can support multiple bus masters 220.

The apparatus 200 may include multiple devices 202, 220 and 222a-222n that communicate when the serial bus 230 is operated in accordance with I2C, I3C or other protocols. At least one device 202, 222a-222n may be configured to operate as a slave device on the serial bus 230. In one example, a slave device 202 may be adapted to provide a control function 204. In some examples, the control function 204 may include circuits and modules that support a display, an image sensor, and/or circuits and modules that control and communicate with one or more sensors that measure environmental conditions. The slave device 202 may include configuration registers 206 or other storage 224, control logic 212, a transceiver 210 and line drivers/receivers 214a and 214b. The control logic 212 may include a processing circuit such as a state machine, sequencer, signal processor or general-purpose processor. The transceiver 210 may include a receiver 210a, a transmitter 210c and common circuits 210b, including timing, logic and storage circuits and/or devices. In one example, the transmitter 210c encodes and transmits data based on timing in one or more signals 228 provided by a clock generation circuit 208.

Two or more of the devices 202, 220 and/or 222a-222n may be adapted according to certain aspects and features disclosed herein to support a plurality of different communication protocols over a common bus, which may include an I2C and/or I3C protocol. For example, devices that communicate using the I2C protocol can coexist on the same 2-wire interface with devices that communicate using I3C protocols. In one example, the I3C protocols may support a mode of operation that provides a data rate between 6 megabits per second (Mbps) and 16 Mbps with one or more optional high-data-rate (HDR) modes of operation that provide higher performance. The I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 230, in addition to data formats and aspects of bus control. In some aspects, the I2C and I3C protocols may define direct current (DC) characteristics affecting certain signal levels associated with the serial bus 230, and/or alternating current (AC) characteristics affecting certain timing aspects of signals transmitted on the serial bus 230. In some examples, a 2-wire serial bus 230 transmits data on a first wire 218 and a clock signal on a second wire 216. In some instances, data may be encoded in the signaling state, or transitions in signaling state of the first wire 218 and the second wire 216. Some I3C protocols enable data to be encoded in the signaling state, or transitions in combined signaling state of the first wire 218 and the second wire 216.

Figure 3:
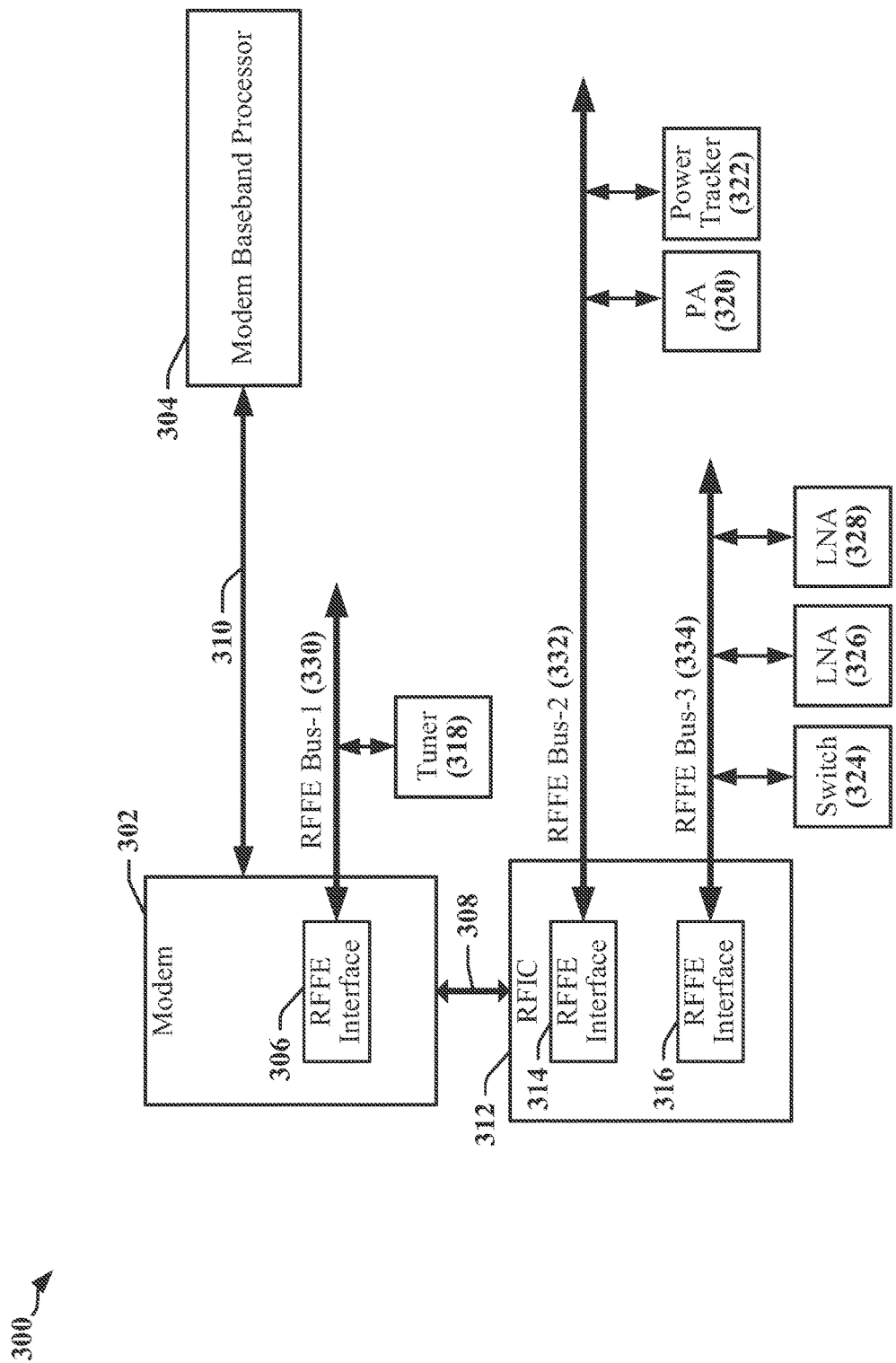
FIG. 3 illustrates a device that employs an RFFE bus to couple various radio frequency front-end devices.

FIG. 3 illustrates an example of bus operated in accordance with RFFE protocols in a system 300 that may be implemented in a chipset, one or more SoCs and/or other configuration of devices. The system 300 employs multiple RFFE buses 330, 332, 334 that can support communication between and with various RF front-end devices 318, 320, 322, 324, 326 328. In this system 300, a modem 302 includes an RFFE interface 306 that can couple the modem 302 to a first RFFE bus 330. The modem 302 may communicate with a baseband processor 304 and an RFIC 312 through one or more communication links 308, 310. The system 300 may be embodied in one or more of a mobile communication device, a mobile telephone, a mobile computing system, a mobile telephone, a notebook computer, a tablet computing device, a media player, a gaming device, a wearable computing and/or communications device, an appliance, or the like.

In various examples, the system 300 may include one or more baseband processors 304, modems 302, RFICs 312, multiple communications links 308, 310, multiple RFFE buses 330, 332, 334 and/or other types of buses. The device 302 may include other types of processors, circuits, modules and/or buses. The system 300 may be configured for various operations and/or different functionalities. In the system 300 illustrated in FIG. 3, the modem 302 is coupled to an RF tuner 318 through its RFFE interface 306 and the first RFFE, bus 330. The RFIC 312 may include one or more RFFE interfaces 314, 316, controllers, state machines and/or processors that configure and control certain aspects of the RF front-end. The RFIC 312 may communicate with a PA 320 and a power tracking module 322 through a first of its RFFE interfaces 314 and the second RFFE, bus 332. The RFIC 312 may communicate with a switch 324 and one or more LNAs 326, 328 through a second of its RFFE interfaces 316 and the third RFFE bus 334.

Figure 4:
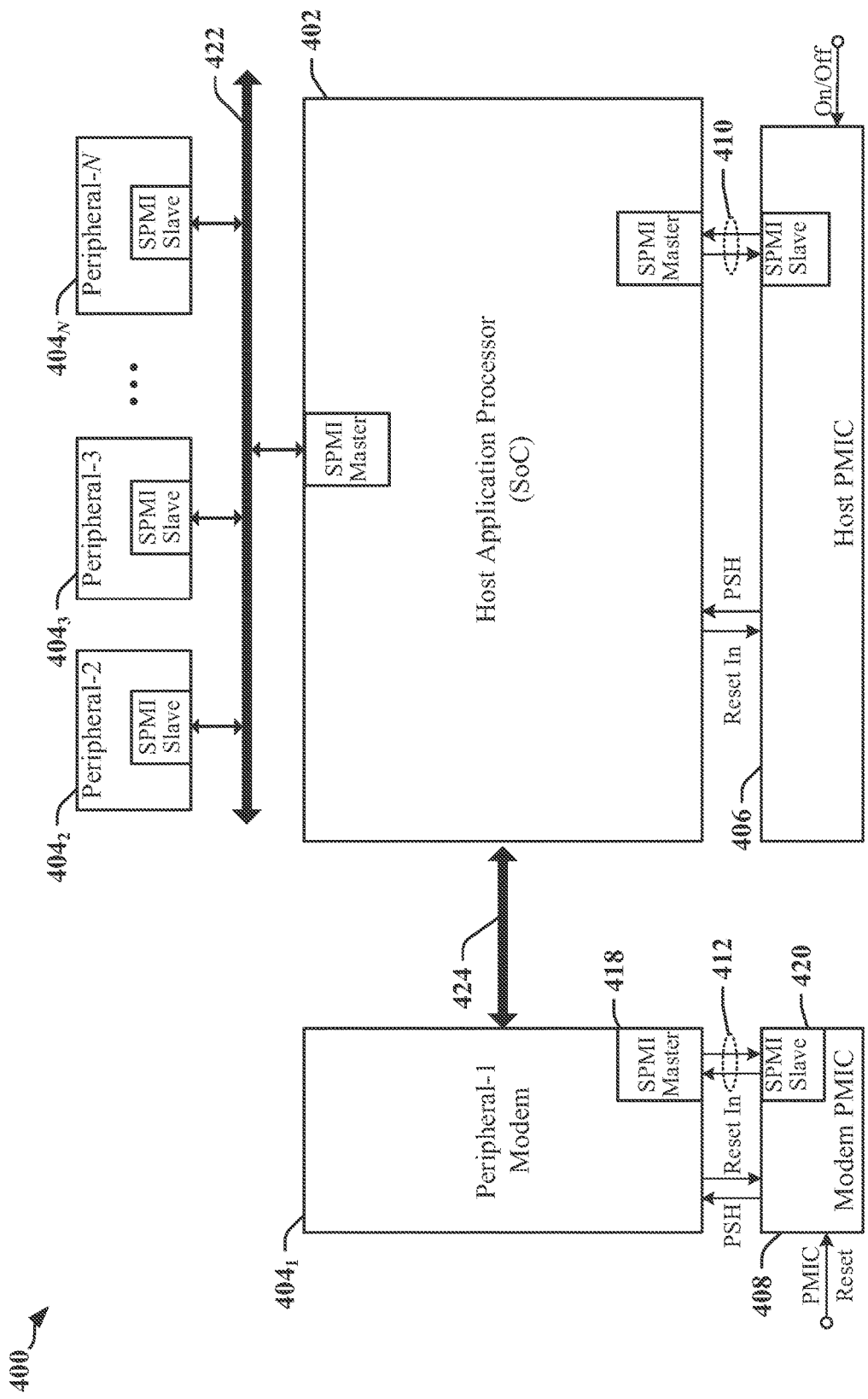
FIG. 4 illustrates a device that employs an SPMI bus to couple various devices in accordance with certain aspects disclosed herein.

The MIPI Alliance system power management interface (SPMI) specifies a hardware interface that may be implemented between baseband or application processors and peripheral components to support a variety of data communication functions including data communication related to power management operations. FIG. 4 illustrates an example of a system 400 which includes data communication links 410, 412, where each of the data communication links 410, 412 is configured as a two-wire serial bus operated in accordance with SPMI protocols. In one example, a first data communication link 410 may be used to connect an integrated power controller of an application processor 402 with a voltage regulation system in a first power management integrated circuit (PMIC 406), and a second data communication link 412 may be used to connect an integrated power controller of a modem $404_1$ with a voltage regulation system in a second PMIC 408. The data communication links 410, 412 can be used to accurately monitor and control processor performance levels required for a given workload or application and dynamically control the various supply voltages in real time based on the performance levels. The data communication links 410, 412 can be used to carry other types of data between the application processor 402 and the first PMIC 406 and/or between the modem $404_1$ and the second PMIC 408. SPMI data communication links may be implemented as multi-drop serial links to connect a variety of different devices and to carry other types of data. Some SPMI data communication links may be optimized for real-time power management functions. Some SPMI data communication links may be may be used as a shared bus that provides high-speed, low-latency connection for devices, where data transmissions may be managed, according to priorities assigned to different traffic classes.

In the system 400 illustrated in FIG. 4, the application processor 402 that may serve as a host device on various data communication links 410, 412, 422 and/or 424 which couple the application processor 402 with multiple peripherals $404_1$-$404_N$, and the PMIC 406. The application processor 402 may be coupled to each of the peripherals $404_1$-$404_N$ using different types of data communication protocols. The data communication links 422, 424 may be operated in accordance with protocols such as the RFFE, SPMI, I3C protocols. In some implementations, at least one of the data communication link 422 and/or 424 may include a serial bus operated in accordance with SPMI protocols that can provide low-latency communications between the application processor 402 and certain peripherals $404_1$-$404_N$. In some examples, the application processor 402 and the modem $404_1$ may be coupled to respective PMICs 406, 408 using power management interfaces implemented using SPMI masters 414, 418. The SPMI masters 414, 418 communicate with corresponding SPMI slaves 416, 420 provided in the PMICs 406, 408 to facilitate real-time control of the PMICs 406, 408.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a transaction in process on the serial bus, the time to transmit commands causing bus turnaround between transmit mode and receive mode, bus arbitration and/or command transmissions specified by protocol.

A VGPIO message is one example of low-latency messages. Mobile communication devices, and other devices that are related or connected to mobile communication devices, increasingly provide greater capabilities, performance and functionalities. In many instances, a mobile communication device incorporates multiple IC devices that are connected using a variety of communication links.

Transmitting VGPIO State Over a Serial Bus

Figure 5:
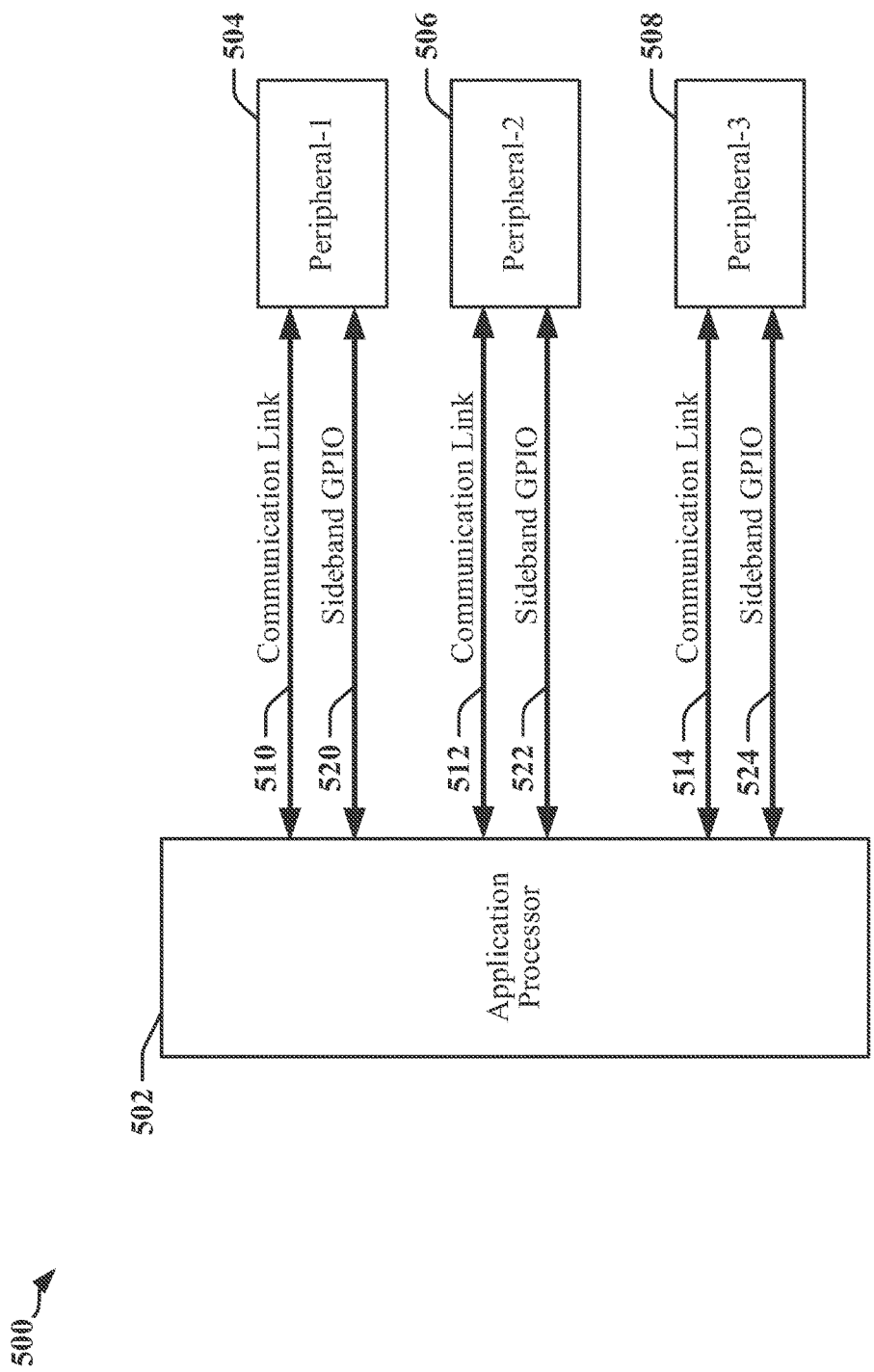
FIG. 5 illustrates a device that employs an I3C bus to couple various front-end devices in accordance with certain aspects disclosed herein.

FIG. 5 illustrates a conventional apparatus 500 that includes an Application Processor 502 and multiple peripheral devices 504, 506, 508. In the example, each peripheral device 504, 506, 508 communicates with the Application Processor 502 over a respective communication link 510, 512, 514 operated in accordance with mutually different protocols. Communication between the Application Processor 502 and each peripheral device 504, 506, 508 may involve additional wires that carry control or command signals between the Application Processor 502 and the peripheral devices 504, 506, 508. These additional wires may be referred to herein as sideband general-purpose input/output (sideband GPIO 520, 522, 524), and in some instances the number of connections needed for sideband GPIO 520, 522, 524 can exceed the number of connections used for a communication link 510, 512, 514.

GPIO provides generic pins/connections that may be customized for particular applications. The term "GPIO pin" or "GPIO terminal" may be used herein to refer to physical generic pins, connectors, wires, traces, pads, and/or terminals that may be used to interconnect circuits and/or devices. In some instances, GPIO pins and connections between GPIO pins may be defined by design or may be customized or repurposed for particular applications or device configurations. For example, a GPIO pin may be programmable to function as an output pin, an input pin or a bidirectional pin, in accordance with application needs. In one example, the Application Processor 502 may assign and/or configure a number of GPIO pins to conduct handshake signaling or inter-processor communication (IPC) with a peripheral device 504, 506, 508 such as a modem. When handshake signaling is used, sideband signaling may be symmetric, where signaling is transmitted and received by the Application Processor 502 and a peripheral device 504, 506, 508. With increased device complexity, the increased number of GPIO pins used for IPC communication may significantly increase manufacturing cost and limit GPIO availability for other system-level peripheral interfaces.

According to certain aspects, the state of physical GPIO, including GPIO pins associated with a communication link, may be captured and virtualized, serialized and transmitted over a data communication link In one example, captured physical GPIO state may be transmitted over a serial bus in packets that are identified by command codes and/or control information, which may indicate packet content (including payload type) and/or destination.

Figure 6:
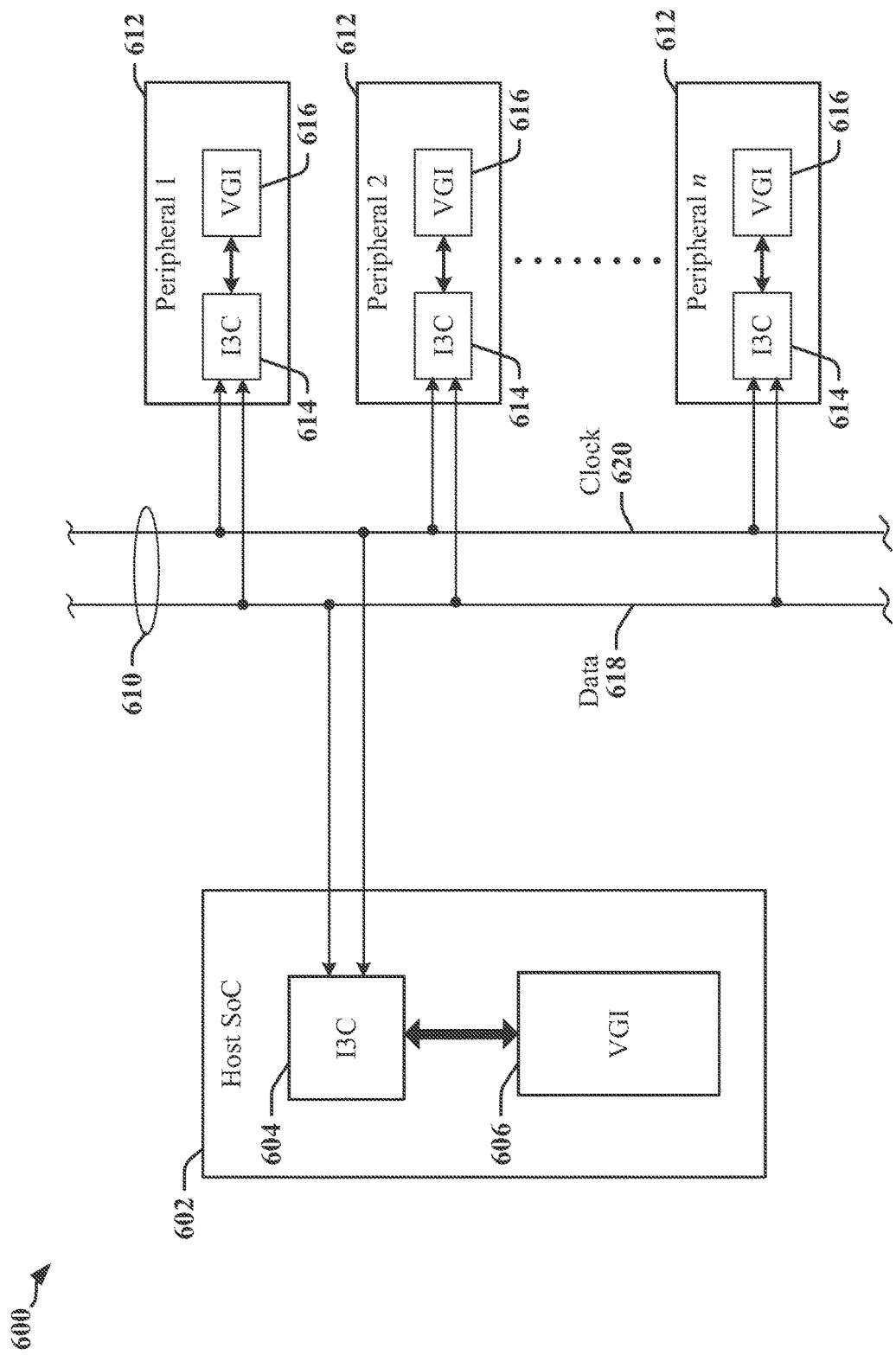
FIG. 6 illustrates an apparatus that includes an Application Processor and multiple peripheral devices that may be adapted according to certain aspects disclosed herein.

FIG. 6 illustrates an example of an apparatus 600 that uses a multi-wire serial bus 610 to couple various devices including a host SoC 602 and a number of peripheral devices 612. It will be appreciated that certain concepts disclosed herein apply equally to communication links operated in accordance with various protocols, including I2C, I3C, RFFE, and SPMI protocols. The host SoC 602 may include a VGPIO finite state machine (VGI FSM 606) and a bus interface 604, where the bus interface 604 cooperates with corresponding bus interfaces 614 in the peripheral devices 612 to provide a communication link between the host SoC 602 and the peripheral devices 612. Each peripheral device 612 includes a VGI FSM 616. In the illustrated example, communications between the host SoC 602 and a peripheral device 612 may be serialized and transmitted over the multi-wire serial bus 610 in accordance with an I2C, I3C, RFFE and/or SPMI protocol. In some examples, the multi-wire serial bus 610 may encode data in a data signal transmitted over a data wire 618 in accordance with timing information provided by a clock signal over a clock wire 620. In certain examples, the multi-wire serial bus 610 may encode data in symbols that control signaling state of the data wire 618 and clock wire 620 with timing/clock information encoded in transitions between signaling state that occur between consecutive symbols.

The VGPIO state transmitted over the multi-wire serial bus 610 may relate to physical GPIO pins, connectors, traces, wires, etc., events and/or control signals. The VGPIO state may be transmitted over a serial bus, including when the VGPIO state represents events or state of physical GPIO pins and signals configured for use with a physical communication link replaced by VGPIO transmitted over the serial bus. Mobile communication devices, and other devices that are related or connected to mobile communication devices increasingly provide greater capabilities, performance and functionalities. In many instances, a mobile communication device incorporates multiple IC devices that are configured for connection using a variety of communications links.

Figure 7:
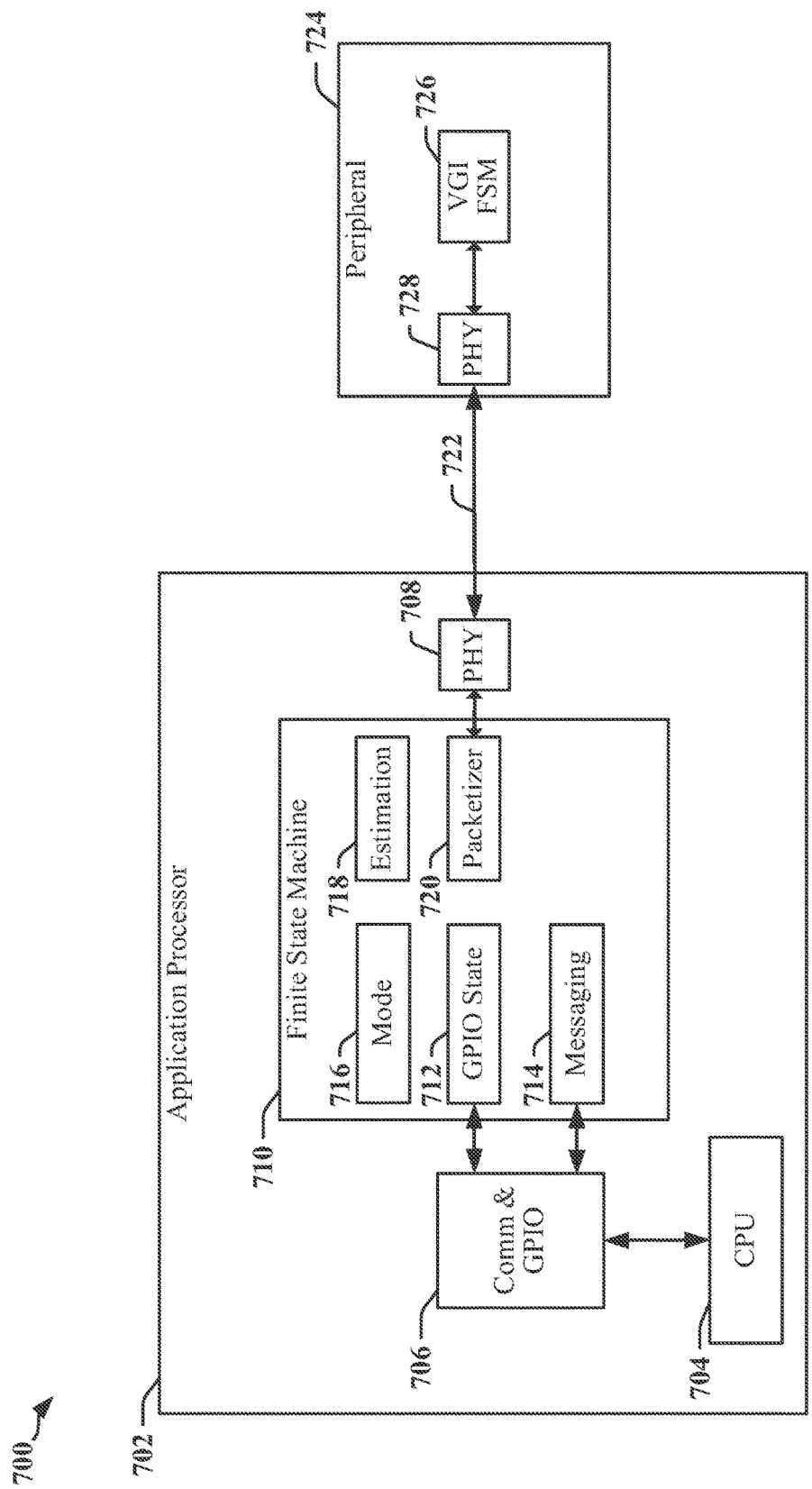
FIG. 7 illustrates an apparatus that has been adapted to support VGPIO in accordance with certain aspects disclosed herein.

FIG. 7 illustrates an apparatus 700 that is adapted to include VGI FSMs 710, 726 operated in accordance with certain aspects disclosed herein. VGI FSMs 710, 726 and related circuits and techniques can reduce the number of physical pins and connections used to connect an Application Processor 702 with a peripheral device 724. Signaling state of a plurality of physical GPIO signals can be virtualized as VGPIO state that can be transmitted over a communication link 722. In one example, VGPIO state may be encoded in packets that are transmitted over a communication link 722 that includes a multi-wire serial bus. The receiving peripheral device 724 may deserialize received packets and extract messages and VGPIO state from the deserialized packets. A VGI FSM 726 in the peripheral device 724 may convert the VGPIO state to current state of physical GPIO pins or events that can be presented at an internal, physical GPIO interface.

In another example, the communication link 722 may be a provided by a radio frequency transceiver that supports wireless communication using, for example, a Bluetooth protocol, a wireless local area network (WLAN) protocol, a cellular wide area network, and/or another wireless communication protocol. When the communication link 722 includes a wireless connection, messages and VGPIO state may be encoded in packets, frames, subframes, or other structures that can be transmitted over the communication link 722, and the receiving peripheral device 724 may extract, deserialize and otherwise process received signaling to obtain the messages and VGPIO state. Upon receipt of messages and/or VGPIO state, the VGI FSM 726 or another component of the receiving device may interrupt its host processor to indicate receipt of messages and/or any changes in physical GPIO state.

In an example in which the communication link 722 is provided as a serial bus, messages and/or VGPIO state information may be transmitted in packets configured for an I2C, I3C, RFFE, SPMI or another standardized serial interface. In the illustrated example, VGI FSMs 710, 726 and related circuits and techniques are employed to accommodate I/O bridging between an Application Processor 702 and a peripheral device 724. The Application Processor 702 may be implemented as an ASIC, SoC or some combination of devices. The Application Processor 702 includes a processor (central processing unit or CPU 704) that generates messages and GPIO associated with one or more communications channels 706. Signaling state of GPIO pins, events, and messages produced by the communications channels 706 may be monitored by respective GPIO monitoring circuits 712, 714 in a VGI FSM 726. In some examples, a GPIO monitoring circuit 712 may be adapted to produce VGPIO state representative of the state of physical GPIO pins and/or changes in the state of the physical GPIO pins. In some examples, other circuits are provided to produce the VGPIO state representative of the signaling state of physical GPIO pins, changes in the signaling state of the physical GPIO pins, and/or an event detected by, or generated within the Application Processor 702.

An estimation circuit 718 may be configured to estimate latency information for communicating GPIO state and/or other information. The estimation circuit 718 may select a protocol, and/or a mode of communication for the communication link 722 that optimizes the latency for encoding and transmitting virtualized GPIO state and/or other information. The estimation circuit 718 may maintain protocol and mode information 716 that characterizes certain aspects of the communication link 722 to be considered when selecting the protocol, and/or a mode of communication. The estimation circuit 718 may be further configured to select a packet type for encoding and transmitting the virtualized GPIO state and/or other information. The estimation circuit 718 may provide configuration information used by a packetizer 720 to encode the virtualized GPIO state and/or other information. In one example, the configuration information is provided as a command that may be encapsulated in a packet such that the type of packet can be determined at a receiver. The configuration information, which may include a command or control message, may also be provided to physical layer circuits (PHY 708). The PHY 708 may use the configuration information to select a protocol and/or mode of communication for transmitting the associated packet. The PHY 708 may then generate the appropriate signaling to transmit the packet.

The peripheral device 724 may include a VGI FSM 726 that can be configured to process data packets received from the communication link 722. The VGI FSM 726 at the peripheral device 724 may extract messages and may map bit positions in VGPIO state information onto physical GPIO pins in the peripheral device 724. In certain embodiments, the communication link 722 is bidirectional, and both the Application Processor 702 and a peripheral device 724 may operate as both transmitter and receiver.

The PHY 708 in the Application Processor 702 and a corresponding PHY 728 in the peripheral device 724 may be configured to establish and operate the communication link 722. The PHY 708 and 728 may be coupled to, or include a radio frequency (RF) transceiver 108 (see FIG. 1) that supports RF communications. In some examples, the PHY 708 and 728 may support a two-wire interface such an I2C, I3C, RFFE, SPMI or SMBus interface at the Application Processor 702 and peripheral device 724, respectively and VGPIO and messages may be encapsulated into a packet transmitted over the communication link 722, which may be a multi-wire serial bus or multi-wire parallel bus for example.

VGI tunneling, as described herein, can be implemented using existing or available protocols configured for operating the communication link 722, and without the full complement of physical GPIO pins. VGI tunneling may employ a serial bus to encapsulate different protocols with different latency requirements, different data transmission volumes and/or different transmission schedules in commands, frames and/or packets that can be transmitted in accordance with an I2C, I3C, SPMI and/or RFFE protocol. VGI FSMs 710, 726 may handle VGI tunneling and signaling without intervention of a processor in the Application Processor 702 and/or in the peripheral device 724. The use of VGI tunneling can reduce pin count, power consumption, and latency associated with the communication link 722.

At the receiving device, received VGPIO state may be converted into physical GPIO state. Certain characteristics of the physical GPIO pins may be configured using VGPIO information transmitted over the communication link 722. For example, slew rate, polarity, drive strength, and other related parameters and attributes of the physical GPIO pins may be configured using received VGPIO information. Configuration parameters used to configure the physical GPIO pins may be stored in configuration registers associated with corresponding GPIO pins. These configuration parameters can be addressed using a proprietary or conventional protocol such as I2C, I3C or RFFE. In one example, configuration parameters may be maintained in I3C addressable registers. Certain aspects disclosed herein relate to reducing latencies associated with the transmission of configuration parameters and corresponding addresses (e.g., addresses of registers used to store configuration parameters).

The VGI interface, or VGI messaging interface (VGMI), enables transmission of messages and VGPIO state, control messages and/or and other information, whereby VGPIO state, control messages and/or other information can be sent individually or in combination in the serial data stream over a communication link 722. In one example, a serial data stream may be transmitted in packets and/or as a sequence of transactions over an I2C, I3C, SPMI or RFFE bus. The presence of VGPIO payloads in an I2C/I3C frame may be signaled using a special command code to identify the frame as a VGPIO frame. VGPIO frames may be transmitted as broadcast frames or addressed frames in accordance with an I2C, I3C, SPMI, RFFE or other protocol. In some implementations, a serial data stream may be transmitted in a form that resembles one or more universal asynchronous receiver/transmitter (UART) signaling and messaging protocols, in what may be referred to as UART_VGI mode of operation.

Figure 8:
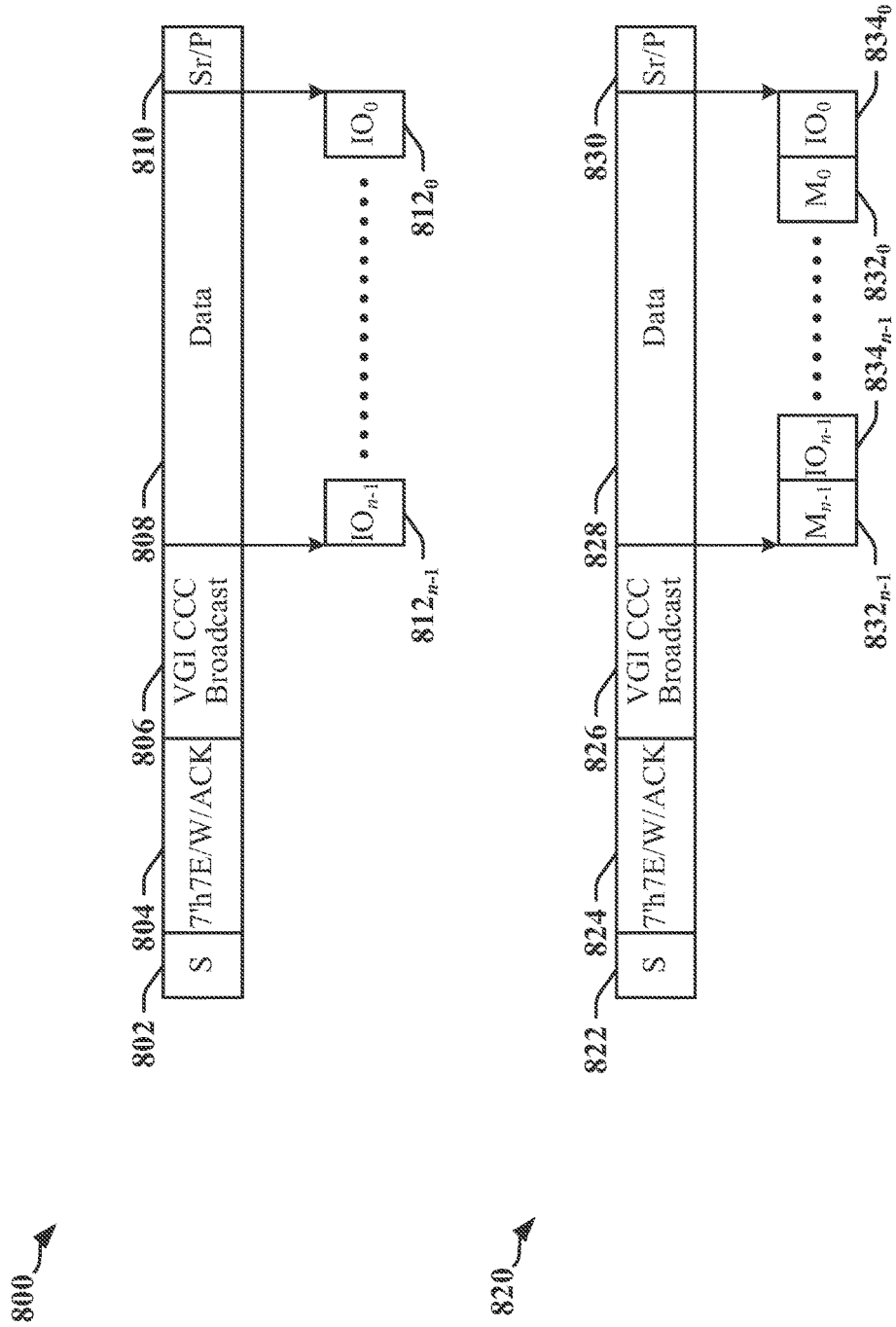
FIG. 8 illustrates examples of VGI broadcast frames according to certain aspects disclosed herein.

FIG. 8 illustrates examples of VGI broadcast frames 800, 820. In a first example, a VGI broadcast frame 800 commences with a start bit 802 (S) followed by a header 804 in accordance with an I2C or I3C protocol. A VGI broadcast frame may be identified using a VGI broadcast common command code 806. A VGPIO data payload 808 includes a number (n) of VGPIO state values $812_0$-$812_{n-1}$, ranging from a first VGPIO state value $812_0$ to an nth VGPIO state value $812_{n-1}$ and representing signaling state of corresponding physical GPIO pins. A VGI FSM may include a mapping table that maps bit positions corresponding to the VGPIO state values $812_0$-$812_{n-1}$ in a VGPIO data payload 808 to physical GPIO pins. The virtual nature of the signaling in the VGPIO data payload 808 can be transparent to processors in the transmitting and receiving devices.

In the second example, a masked VGI broadcast frame 820 may be transmitted by a host device to change the state of one or more GPIO pins without disturbing the state of other GPIO pins. In this example, the I/O signals for one or more devices are masked, while the I/O signals in a targeted device are unmasked. The masked VGI broadcast frame 820 commences with a start bit 822 followed by a header 824. A masked VGI broadcast frame 820 may be identified using a masked VGI broadcast common command code 826. The VGPIO data payload 828 may include I/O signal values $834_0$-$834_{n-1}$ and corresponding mask bits $832_0$-$832_{n-1}$, ranging from a first mask bit $M_0$ $832_0$ for the first I/O signal ($IO_0$) to an nth mask bit $M_{n-1}$ $832_{n-1}$ for the nth I/O signal $IO_{n-1}$.

A stop bit or synchronization bit (Sr/P 810, 830) terminates the VGI broadcast frame 800, 820. A synchronization bit may be transmitted to indicate that an additional VGPIO payload is to be transmitted. In one example, the synchronization bit may be a repeated start bit in an I2C interface.

Figure 9:
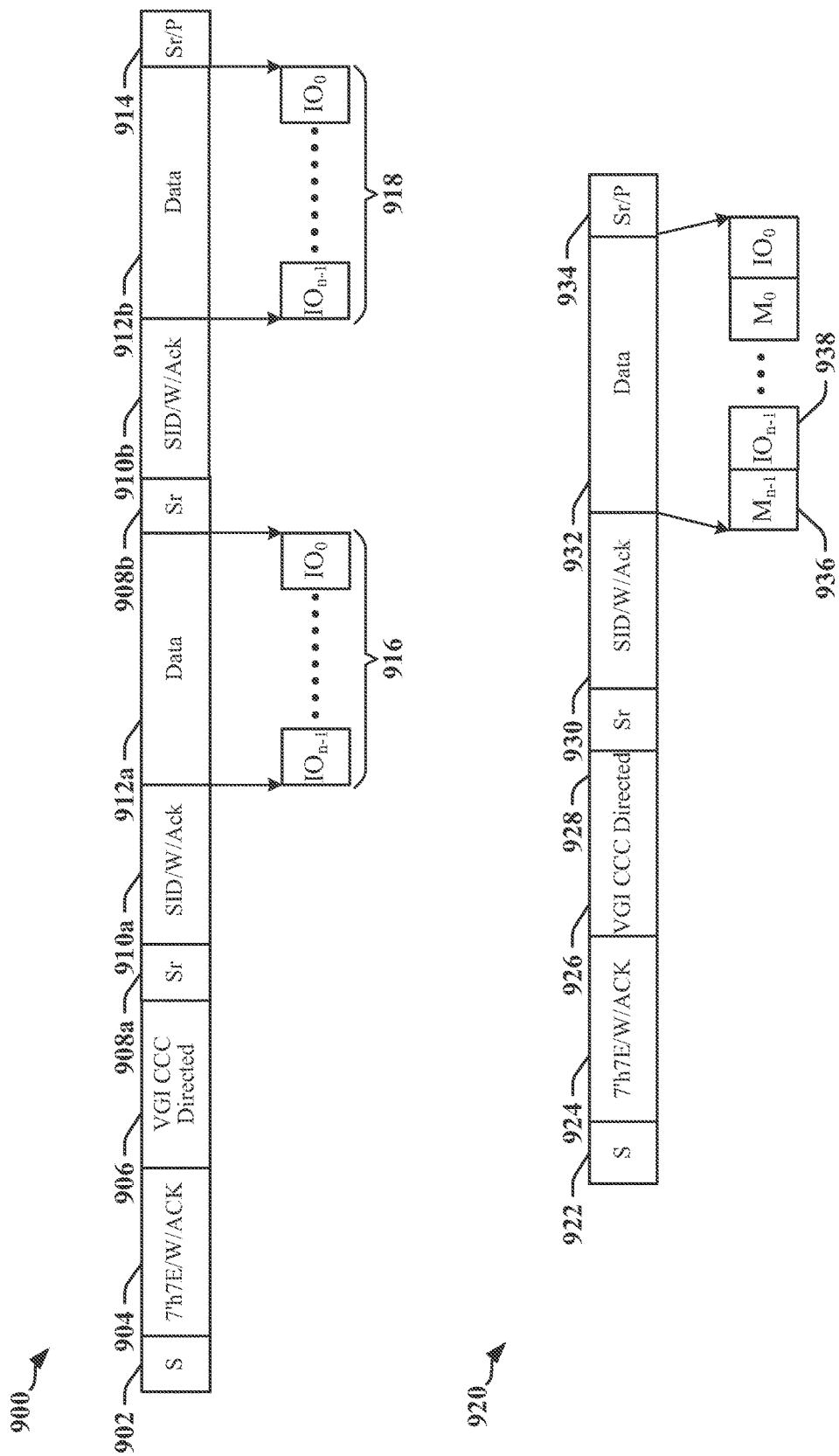
FIG. 9 illustrates examples of VGI directed frames according to certain aspects disclosed herein.

FIG. 9 illustrates examples of VGI directed frames 900, 920. In a first example, VGI directed frames 900 may be addressed to a single peripheral device or, in some instances, to a group of peripheral devices. The first of the VGI directed frames 900 commences with a start bit 902 (S) followed by a header 904 in accordance with an I2C or I3C protocol. A VGI directed frame 900 may be identified using a VGI directed common command code 906. The directed common command code 906 may be followed by a synchronization field 908a (Sr) and an address field 910a that includes a slave identifier to select the addressed device. The directed VGPIO data payload 912a that follows the address field 910a includes values 916 for a set of I/O signals that pertain to the addressed device. VGI directed frames 900 can include additional directed payloads 912b for additional devices. For example, the first directed VGPIO data payload 912a may be followed by a synchronization field 908b and a second address field 910b. In this example, the second directed VGPIO payload 912b includes values 918 for a set of I/O signals that pertain to a second addressed device. The use of VGI directed frames 900 may permit transmission of values for a subset or portion of the I/O signals carried in a VGI broadcast frame 800, 820.

In the second example, a masked VGI directed frame 920 may be transmitted by a host device to change the state of one or more GPIO pins without disturbing the state of other GPIO pins in a single peripheral device and without affecting other peripheral devices. In some examples, the I/O signals in one or more devices may be masked, while selected I/O signals in one or more targeted device are unmasked. The masked VGI directed frame 920 commences with a start bit 922 followed by a header 924. A masked VGI directed frame 920 may be identified using a masked VGI directed common command code 926. The masked VGI directed command code 926 may be followed by a synchronization field 928 (Sr) and an address field 930 that includes a slave identifier to select the addressed device. The directed payload 932 that follows includes VGPIO values for a set of I/O signals that pertain to the addressed device. For example, the VGPIO values in the directed data payload 932 may include I/O signal values 938 and corresponding mask bits 936.

A stop bit or synchronization bit (Sr/P 914, 934) terminates the VGI directed frames 900, 920. A synchronization bit may be transmitted to indicate that an additional VGPIO payload is to be transmitted. In one example, the synchronization bit may be a repeated start bit in an I2C interface.

Figure 10:
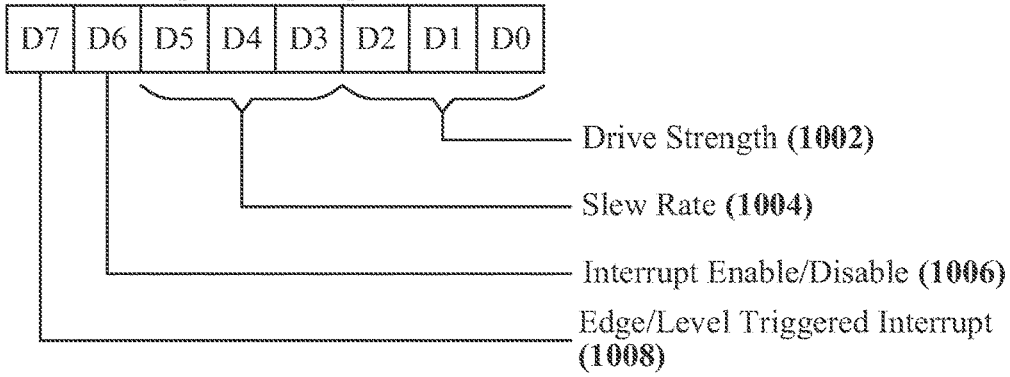
FIG. 10 illustrates configuration registers that may be associated with a physical pin according to certain aspects disclosed herein.
Figure 10:
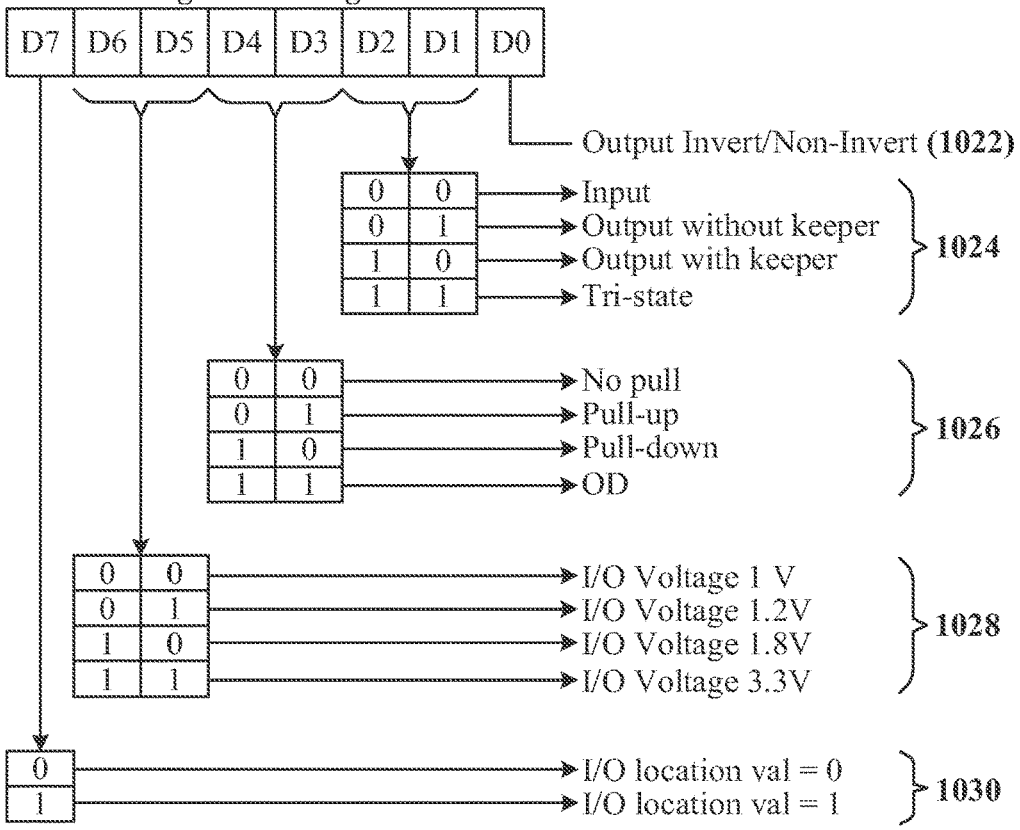

At the receiving device (e.g., the Application Processor 502 and/or a peripheral device 504, 506, 508 of FIG. 5), received VGPIO state values are expanded into physical GPIO signaling states presented on GPIO pins. The term "pin," as used herein, may refer to a physical structure such as a pad, pin or other interconnecting element used to couple an IC to a wire, trace, through-hole via, or other suitable physical connector provided on a circuit board, substrate or the like. Each GPIO pin may be associated with one or more configuration registers that store configuration parameters for the GPIO pin. FIG. 10 illustrates configuration registers 1000 and 1020 that may be associated with a physical pin.

Each configuration register 1000, 1020 is implemented as a one-byte (8 bits) register, where different bits or groups of bits define a characteristic or other feature that can be controlled through configuration. In a first example, bits D0-D2 1002 control the drive strength for the GPIO pin, bits D3-D5 1004 control the slew rate for GPIO pin, bit D6 1006 enables interrupts, and bit D7 1008 determines whether interrupts are edge-triggered or triggered by voltage-level. In a second example, bit D0 1022 selects whether the GPIO pin receives an inverted or non-inverted signal, bits D1-D2 1024 define a type of input or output pin, bits D3-D4 1026 defines certain characteristics of an undriven pin, bits D5-D6 1028 define voltage levels for signaling states, and bit D7 1030 controls the binary value for the GPIO pin (i.e., whether GPIO pin carries carry a binary one or zero).

Event Latency in VGI Transmissions

The use of VGI tunneling to reduce the number of physical pins and connections for IC devices can introduce latency into the virtualized signaling. Latency may be attributed to the time required to convert physical GPIO signaling states to a VGPIO data packet at a first device, transmit the VGPIO data packet over a communication link from the first device to a second device, and convert the VGPIO data packet to physical GPIO signaling states at the second device. In many implementations, the communication link contributes a majority of the latency associated with the use of VGI tunneling.

Figure 11:
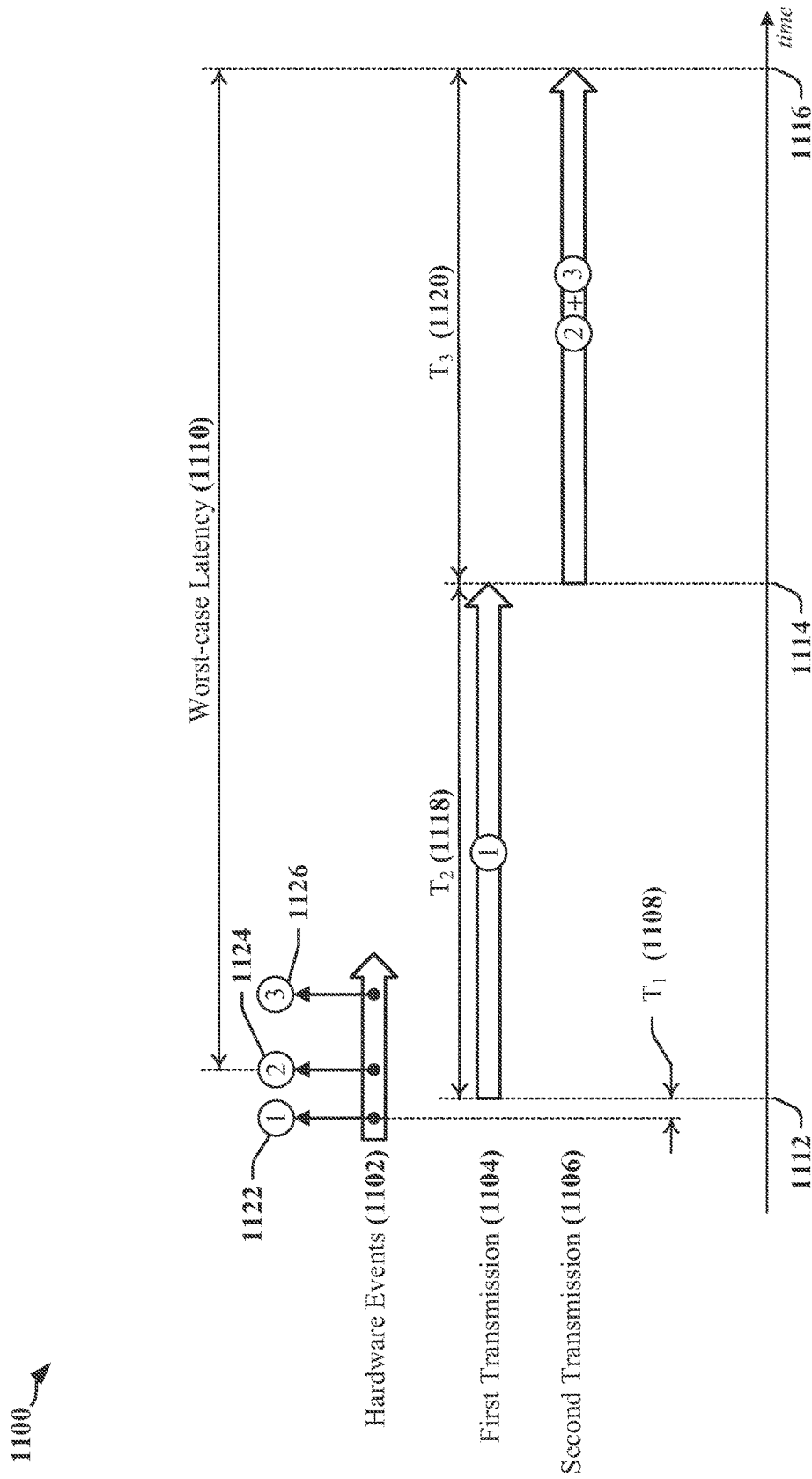
FIG. 11 is a timing diagram that illustrates certain contributors to VGI latency

FIG. 11 is a timing diagram 1100 that illustrates certain contributors to VGI latency. The VGI FSM typically triggers transmission of a VGPIO data packet for each hardware event 1122, 1124, 1126 generated or detected. A hardware event 1122, 1124, 1126 may be generated after a transition in signaling state or operating characteristic of one physical GPIO pin. Occurrence or detection of a single hardware event 1122, 1124, 1126 can initiate transmission of a VGPIO data packet. In some implementations, a peer-to-peer (P2P) VGI protocol may be implemented to replicate physical GPIO signaling states from one device to another. In one example, a VGPIO messaging interface (VGMI) may provide a P2P configuration that implements a VGI communication interface using a VGI FSM. In some implementations, VGPIO data packets are carried over serial interfaces such as I2C, I3C, RFFE, SPMI, etc. These serial buses may operate in half-duplex mode and/or may be clocked at a frequency that is one or more orders of magnitude lower than the frequency that clocks the VGI FSM. Certain aspects disclosed herein relate equally to systems that provide for transmission of VGPIO information over a serial interface and systems that support a faster P2P VGMI.

The first-occurring hardware event 1122 may initiate a first transmission 1104 to carry a VGPIO data packet that reflects physical GPIO signaling state after the first-occurring hardware event 1122. There may be a short delay 1108 ($T_1$) between occurrence of the first-occurring hardware event 1122 and the time 1112 of initiation of the first transmission 1104. The delay 1108 may correspond to a small number of clock cycles consumed by the FSM while processing the first-occurring hardware event 1122. At some point after the short delay 1108, a second-occurring hardware event 1124 may be detected, followed by detection of a third-occurring hardware event 1126. These later-occurring hardware events 1124, 1126 are not processed in time to be communicated in the first transmission 1104. The later-occurring hardware events 1124, 1126 may be communicated in a second transmission 1106 upon completion of the first transmission 1104. For the purposes of this discussion, it will be assumed that the second transmission 1106 can start at or near the time 1114 when the first transmission 1104 concludes. Communication of the physical GPIO signaling state corresponding to the later-occurring hardware events 1124, 1126 can be considered complete at the end 1116 of the second transmission 1106.

The latency ($L_1$) associated with communicating the first-occurring hardware event 1122 may be calculated as:

$$L_1 = T_1 + T_2,$$

where $T_2$ is the time 1118 required to complete the first transmission 1104. The worst-case latency ($L_2$) associated with communicating the second-occurring hardware event 1124 may be calculated as:

$$L_2 = T_2 + T_3.$$

where $T_3$ is the time 1120 required to complete the second transmission 1106, and where the second-occurring hardware event 1124 occurs at or near time 1112 of initiation of the first transmission 1104. It can be appreciated that the worst-case latency 1110 occurs when later-occurring hardware events 1124, 1126 are detected shortly after the time 1112 at which the communication link becomes busy transmitting a VGPIO data packet related to the first-occurring hardware event 1122.

According to certain aspects disclosed herein, overall, average or aggregated latencies in VGI transmissions may be reduced through the use of a programmable timer to delay transmission of the first-occurring hardware event 1122. The delay in transmission may operate effectively when state changes reflected in VGPIO can be expected to occur over a period of time that is significantly less than the overall time taken to communicate the VGPIO states over a serial bus.

Figure 12:
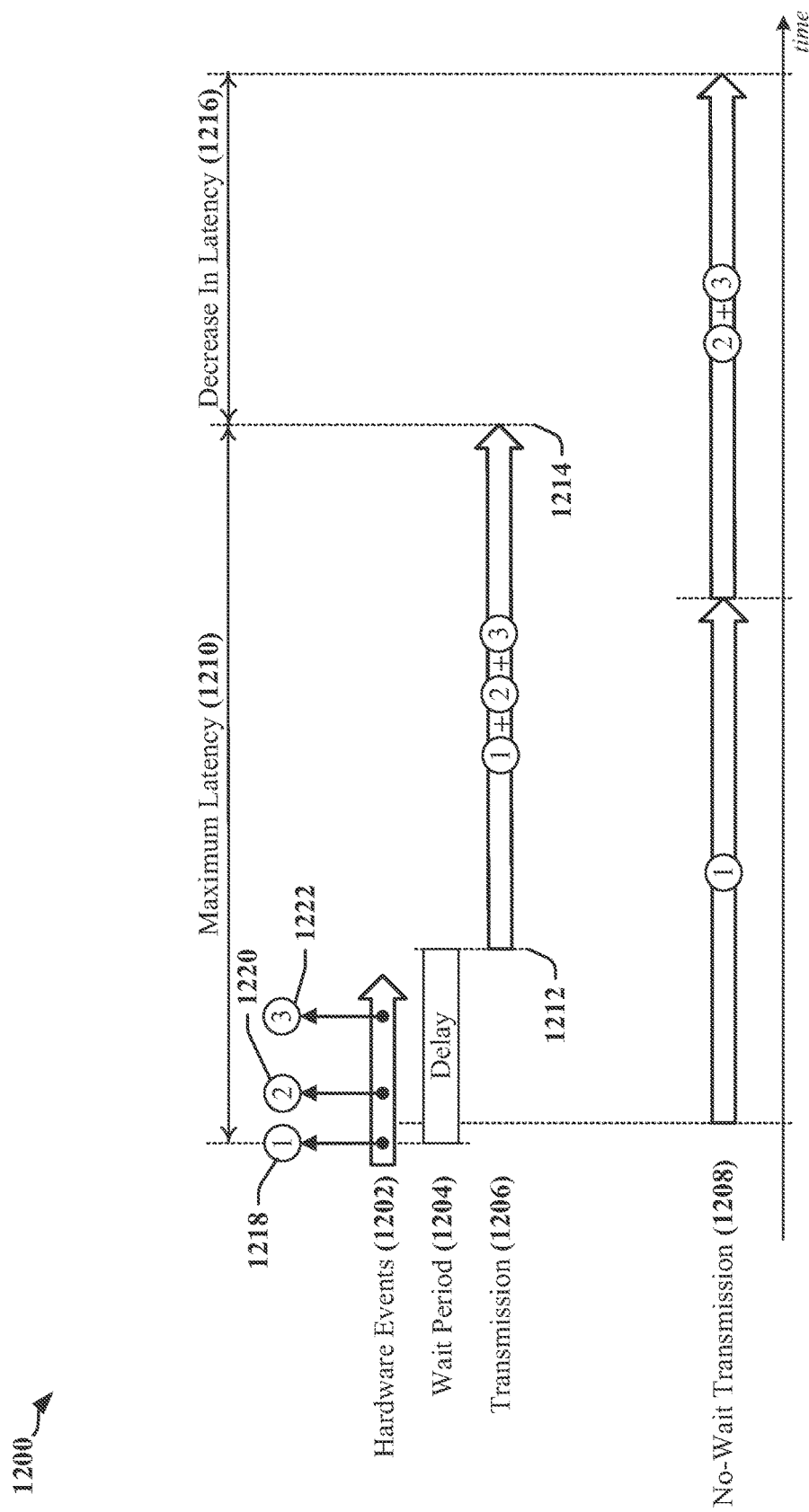
FIG. 12 is a timing diagram that illustrates a first example of a technique that may be employed to reduce latencies associated with VGI transmissions in accordance with certain aspects disclosed herein.

FIG. 12 is a timing diagram 1200 that illustrates a first example of a technique that may be employed to reduce latencies associated with VGI transmissions in accordance with certain aspects disclosed herein. Here, the VGI FSM delays transmitting a VGPIO data packet after a first-occurring hardware event 1218. Transmission is delayed whether the communication link is busy, idle, or available for transmission of VGPIO data. A timer may be initiated after occurrence or detection of the first-occurring hardware event 1218, where the timer is used to delay transmission of a VGPIO data packet for a wait period 1204 determined by the timer. The wait period 1204 has a sufficiently long duration that one or more later-occurring hardware events 1220, 1222 may occur before a transmission 1206 is initiated. The transmission 1206 includes a VGPIO data packet that reflects physical GPIO signaling state after the first-occurring hardware event 1218 and the later-occurring hardware events 1220, 1222. The worst-case latency 1210 corresponds to the first-occurring hardware event 1218. The latencies corresponding to the later-occurring hardware events 1220, 1222 may be reduced with respect to the latency for a no-wait transmission 1208 (see also FIG. 11) by a duration 1216 that may be calculated as the difference of one VGPIO data packet transmission time and the wait period 1204.

The wait period 1204 may be a fixed period that can be configured by design, at initial device configuration, and/or dynamically during operation. In one example, the duration of the wait period 1204 may be selected based on a window of time that reflects an uncertainty period during which certain related signals can be expected to transition. In other examples, the wait period 1204 may be variable.

Figure 13:
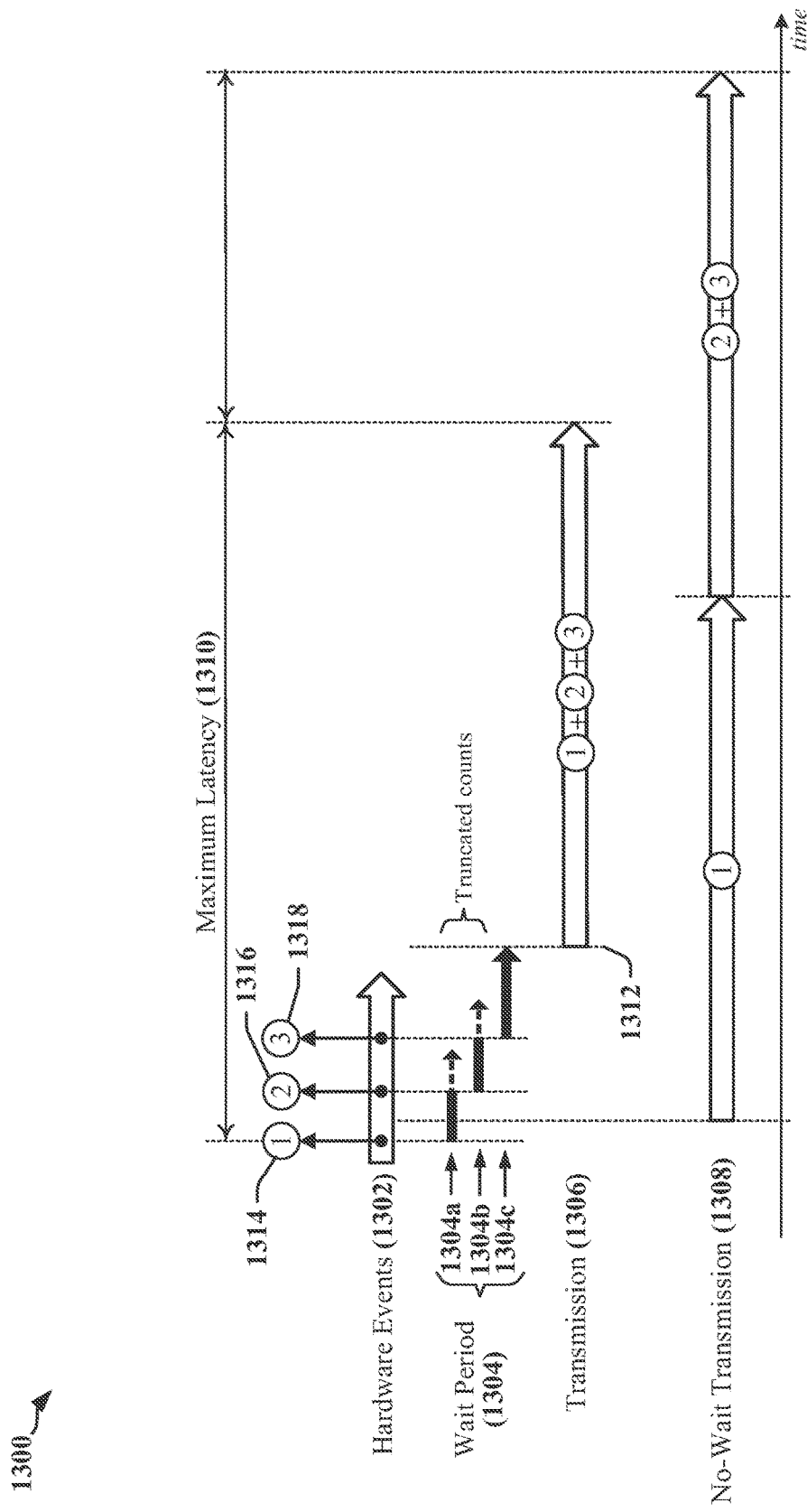
FIG. 13 is a timing diagram that illustrates a second example of a technique that may be employed to reduce latencies associated with VGI transmissions in accordance with certain aspects disclosed herein.

FIG. 13 is a timing diagram 1300 that illustrates a second example of a technique that may be employed to reduce latencies associated with VGI transmissions in accordance with certain aspects disclosed herein. Here, the VGI FSM delays transmitting a VGPIO data packet after a first-occurring hardware event 1314. Transmission is delayed for the duration of a variable wait period 1304. A timer may be initiated or re-initiated after occurrence or detection of each hardware event 1314, 1316, 1318. While the timer is active, the VGI FSM delays transmitting a VGPIO data packet. In the example, the first-occurring hardware event 1314 initiates a first portion 1304a of the wait period 1304. The timer is re-initialized when a second-occurring hardware event 1316 is detected, and a second portion 1304b of the wait period 1304 commences. The timer is re-initialized when a third-occurring hardware event 1318 is detected, and a third portion 1304c of the wait period 1304 commences. In the illustrated example, the wait period 1304 terminates after the third-occurring hardware event 1318 when the timer has elapsed or completed its count. In some instances, a second timer may be initiated to provide a maximum wait time, after which transmission is initiated regardless of whether the wait period 1304 has ended.

The wait period 1304 illustrated in FIG. 13 may provide optimized latency reductions with respect to the example illustrated in FIG. 13. For example, the timer may be initialized with a delay period that runs for a shorter duration (per event 1314, 1316, 1318) than the wait period 1204 of FIG. 12. The wait period 1304 of FIG. 13 may be shorter when fewer than expected transitions occur.

Figure 14:
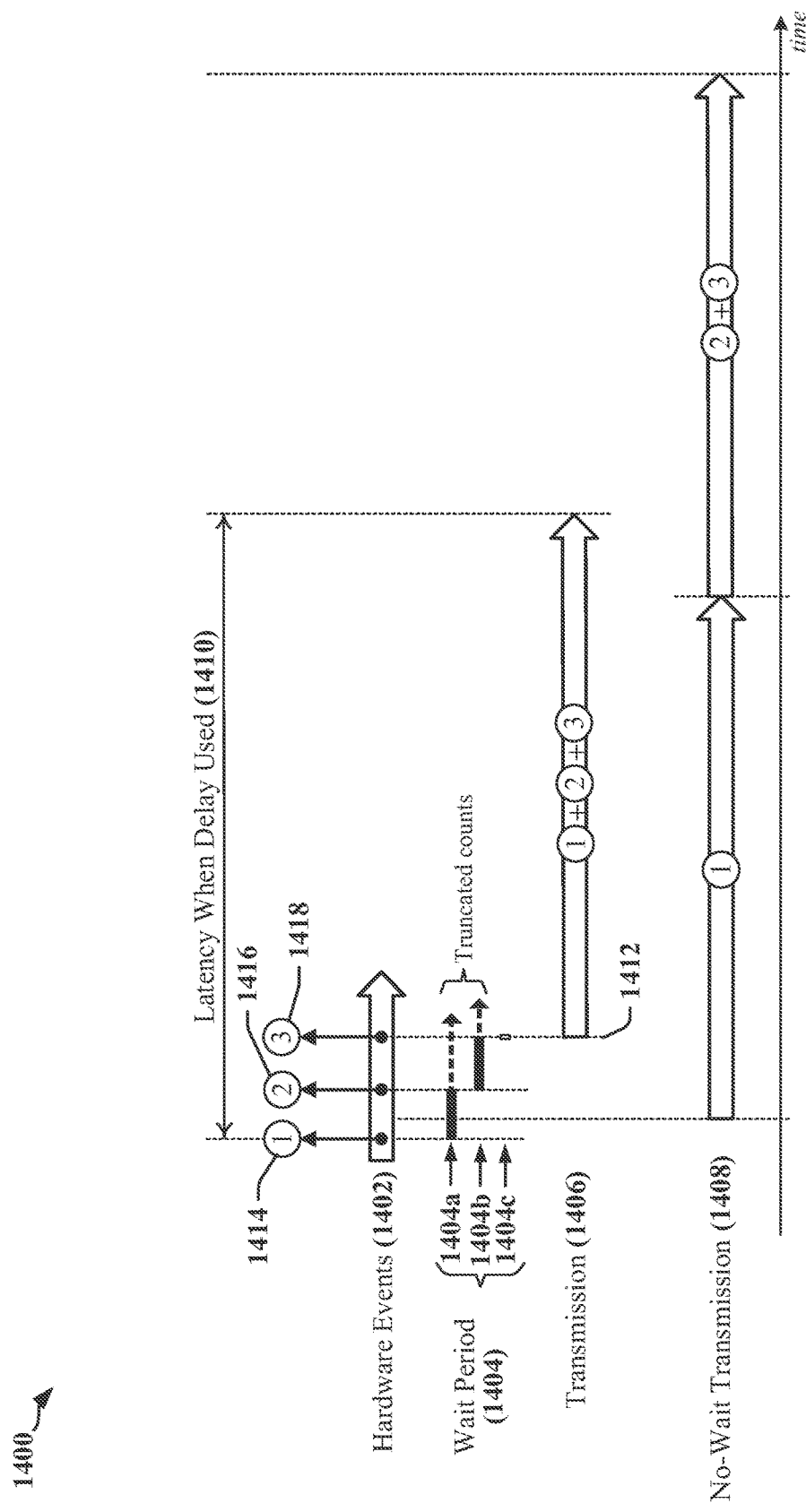
FIG. 14 is a timing diagram that illustrates a third example of a technique that may be employed to reduce latencies associated with VGI transmissions in accordance with certain aspects disclosed herein.

FIG. 14 is a timing diagram 1400 that illustrates third example of a technique that may be employed to reduce latencies associated with VGI transmissions in accordance with certain aspects disclosed herein. Here, the VGI FSM delays transmitting a VGPIO data packet after a first-occurring hardware event 1414. Transmission is delayed for the duration of a variable wait period 1404. A timer may be initiated or re-initiated after occurrence or detection of each hardware event 1414, 1416, 1418. In this example, the timer may be initialized with a different value for each hardware event 1414, 1416, 1418. The different values may reflect differences in priorities of the respective hardware events 1414, 1416, 1418.

While the timer is active, the VGI FSM delays transmitting a VGPIO data packet. The first-occurring hardware event 1414 initiates a first portion 1404a of the wait period 1404. In the illustrated example, the first-occurring hardware event 1414 initializes the timer with a value that corresponds to the longest duration of any portion 1404a, 1404b, 1404c of the wait period 1404. The timer is re-initialized when a second-occurring hardware event 1416 is detected, and a second portion 1404b of the wait period 1404 commences. In the illustrated example, the second-occurring hardware event 1416 initializes the timer with a value that corresponds to the second longest duration of any portion 1404a, 1404b, 1404c of the wait period 1404. In the illustrated example, the timer is cleared when third-occurring hardware event 1418 is detected, terminating the wait period 1404 and causing the transmission 1406 to be initiated immediately.

In the example illustrated in FIG. 14, the third-occurring hardware event 1418 is assigned highest priority and experiences minimum latency. The techniques illustrated in FIGS. 13 and 14 enable automatic scaling of wait period 1304, 1402. The technique illustrated in FIG. 14 permits a priority scheme to be implemented that can assign priorities to individual VGPIO bits or VGPIO values defined by multiple bits.

Figure 15:
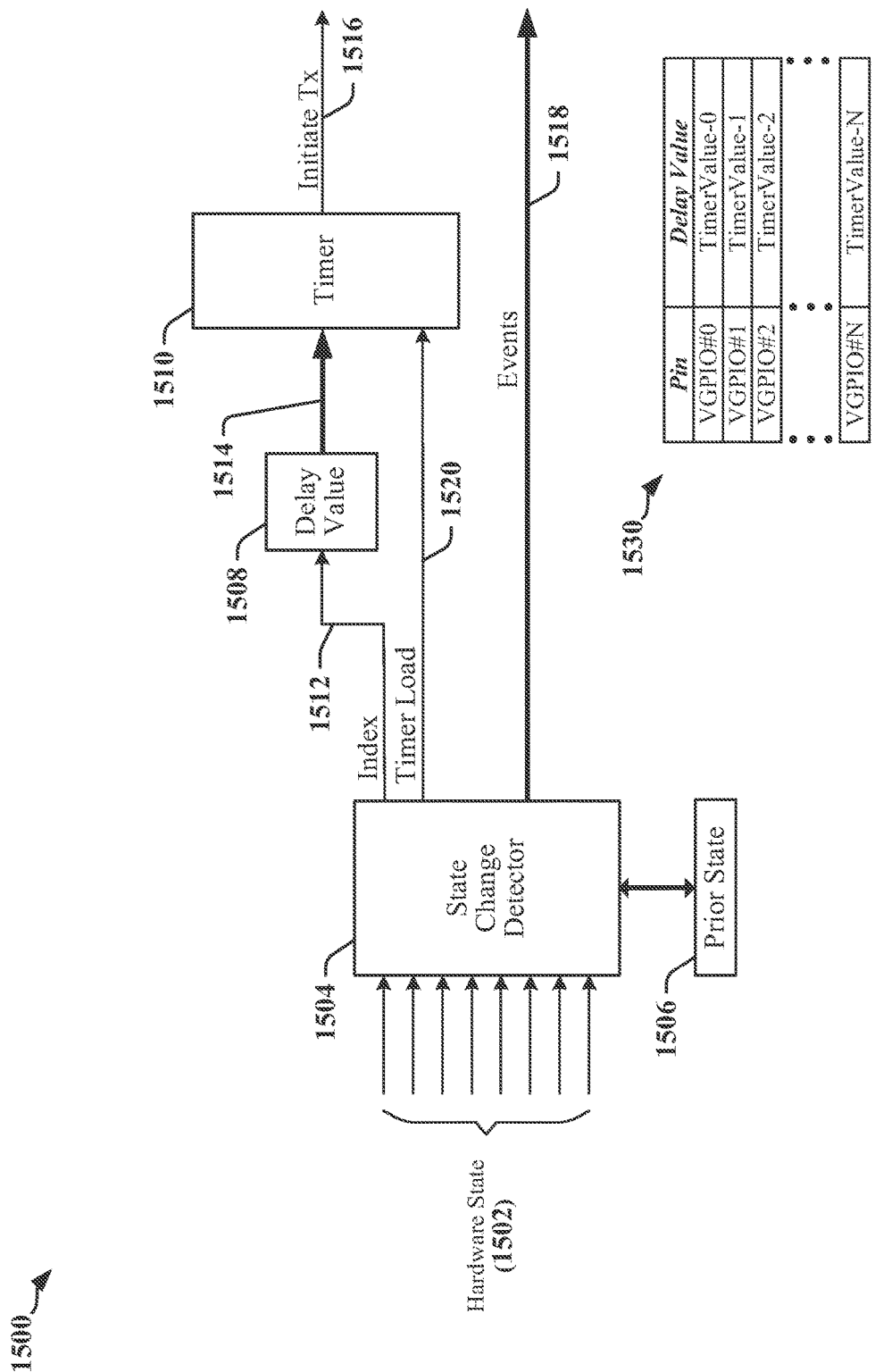
FIG. 15 illustrates an example of a timing circuit configured to detect hardware events and implement variable delays indexed to VGPIO bits according to certain aspects disclosed herein.

FIG. 15 illustrates a timing circuit 1500 configured to detect hardware events and implement variable delays indexed to VGPIO bits. In one example, hardware GPIO state 1502 is provided to a state change detector 1504 that compares the hardware GPIO state 1502 with a stored copy of prior hardware GPIO state 1506. Comparison logic may generate an event 1518 when differences are detected between the hardware GPIO state 1502 and the prior hardware GPIO state 1506, and the comparison logic may update the prior hardware GPIO state 1506 after generating an event 1518. In another example, edge detection circuits may generate an event 1518 when transitions are detected in the hardware GPIO state 1502.

The wait period 1304, 1402 may be controlled by a timer 1510. In one example, the timer 1510 may be implemented using a counter that is initiated by a delay value 1514. The output of the counter is set to the loaded delay value 1514 and the counter is automatically incremented or decremented. The wait period 1304, 1402 may be terminated when the output of the counter reaches zero or another configured comparison value. The state change detector 1504 may generate a timer load signal 1520 and provide an index signal 1512 when an event 1518 is generated. The index signal 1512 may be a multi-bit signal that selects a delay value 1514 from registers 1508 or other storage. The table 1530 illustrates one example of a configuration of the registers 1508 or other storage. The index signal 1512 may select a delay value 1514 configured for one VGPIO bit affected by the event 1518, or associated with the event 1518. When multiple VGPIO bits are affected by the event 1518, the state change detector 1504 may configure the index to select the delay value 1514 corresponding to the VGPIO bit affected by the event 1518, or associated with the event 1518 that has the shortest duration. The delay value 1514 is loaded into a timer 1510 in response to the timer load signal 1520. The timer may be implemented using a counter clocked by a system clock signal or real-time clock signal, for example. The timer 1510 may produce an output 1516 that enables transmission of VGPIO data when the wait period corresponding to the delay value 1514 has expired. In some examples, the output 1516 of the timer 1510 may disable a bus interface until a VGPIO packet is ready for transmission and the wait period corresponding to the delay value 1514 has expired.

Figure 16:
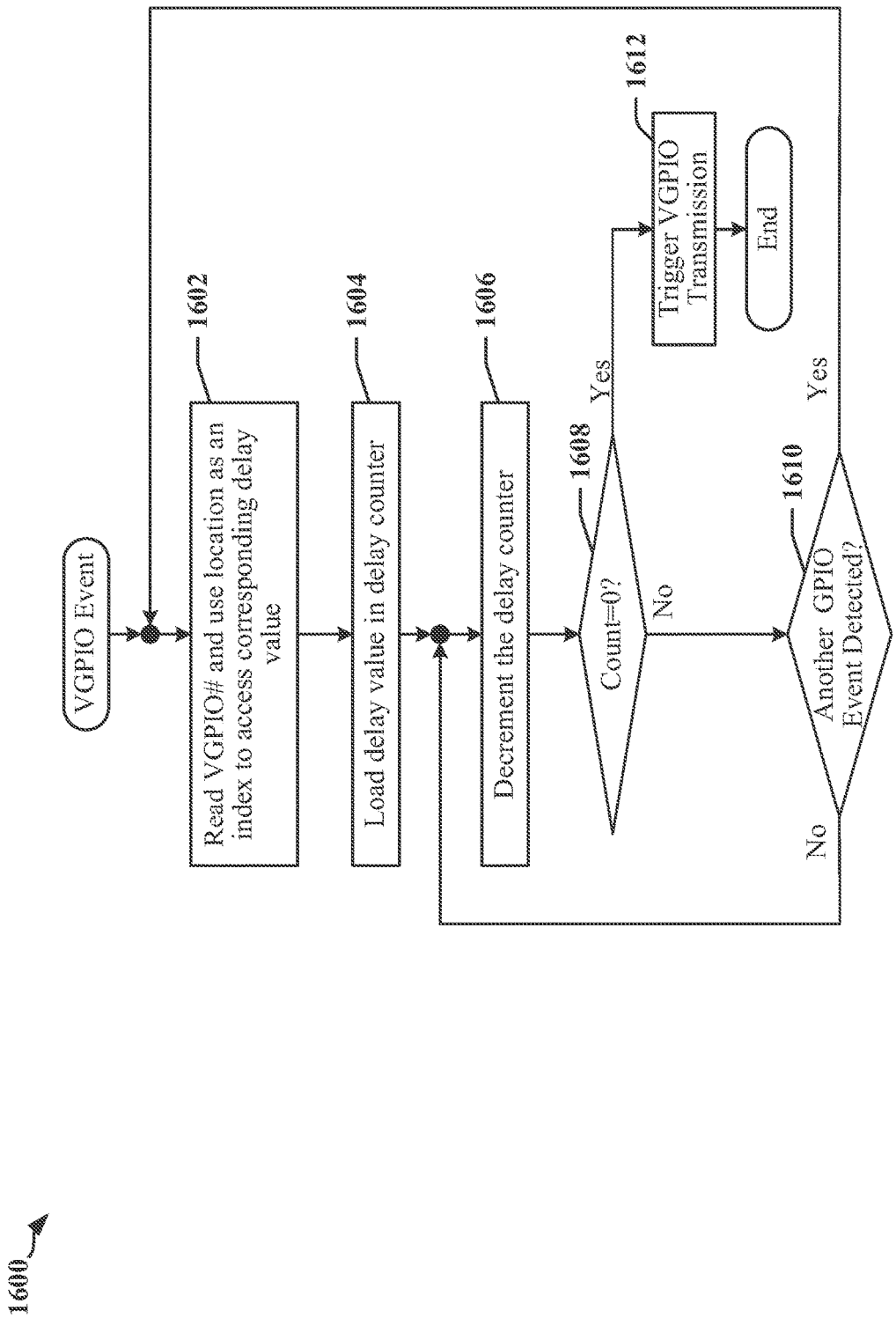
FIG. 16 is a flowchart of a method that illustrates the operation of the circuit of FIG. 15 in response to a VGPIO event in accordance with certain aspects disclosed herein.

FIG. 16 is a flowchart 1600 of a method that illustrates the operation of the circuit 1500 of FIG. 15 in response to a VGPIO event 1518. The circuit 1500 may be controlled or performed by a VGI FSM (see FIG. 7 for example). At block 1602, a VGPIO bit associated with a change in state of a physical GPIO pin that generated the event 1518 may be determined. A number identifying the VGPIO bit may be used to provide an index to access a corresponding delay value. The index may be used to generate the index signal 1512, where the index signal 1512 may be used to select a delay value 1514 from one or more from registers 1508.

At block 1604, the delay value 1514 may be loaded into a delay counter. The delay counter may correspond to the timer 1510.

At block 1606, the current value of the counter may be read and/or decremented. At block 1608, it may be determined if the wait period has expired. The wait period may be expired when the counter has a zero value. If the wait period has expired, a communication interface may be triggered to transmit VGPIO data at block 1612.

If the wait period has not expired, then at block 1610 it is determined at block 1610 if another GPIO event has been detected. If another GPIO event has been detected, then the method continues at block 1602. If another GPIO event has not been detected, then the method continues at block 1606.

Examples of Processing Circuits and Methods

Figure 17:
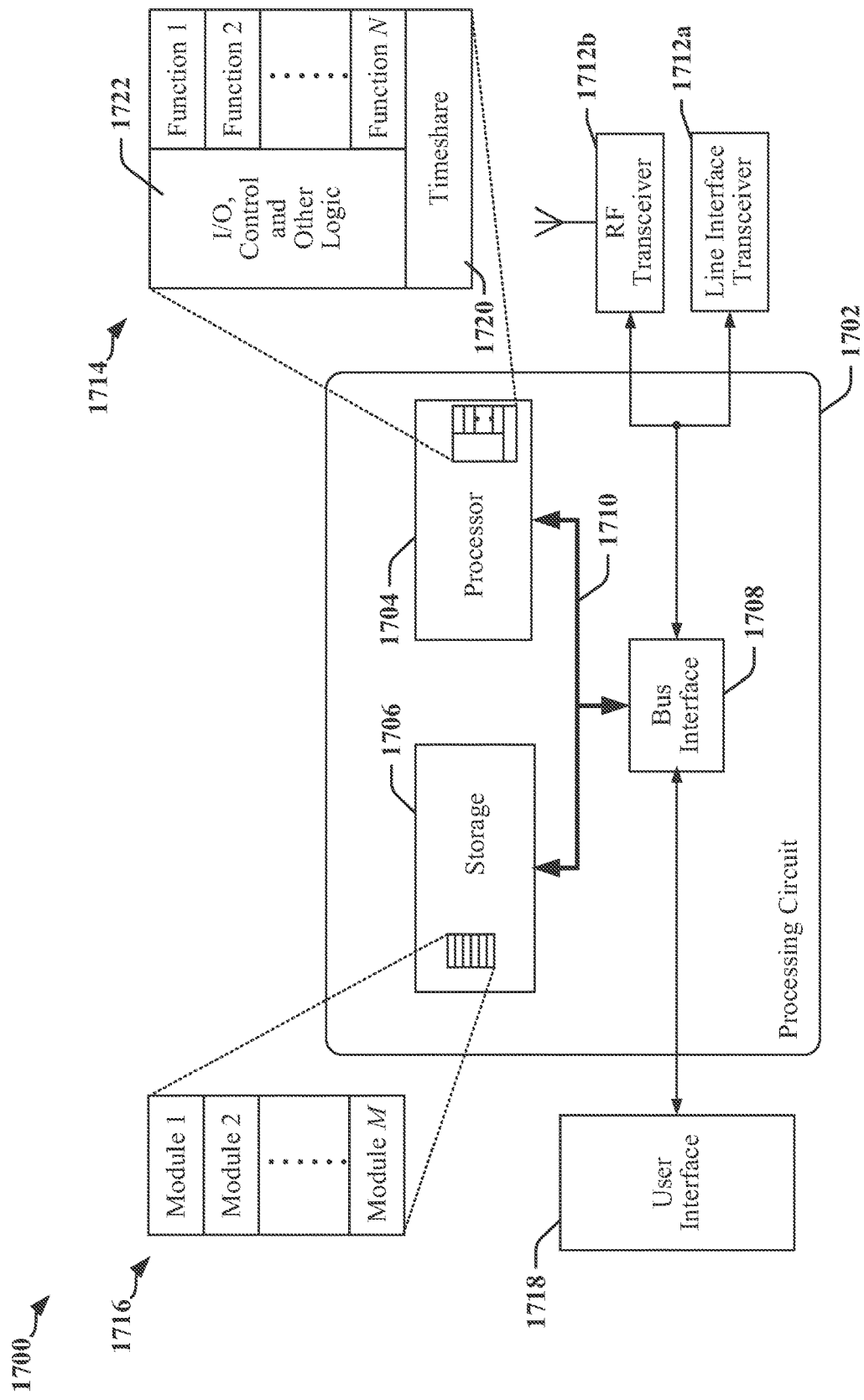
FIG. 17 illustrates one example of an apparatus employing a processing circuit that may be adapted according to certain aspects disclosed herein.

FIG. 17 is a diagram illustrating an example of a hardware implementation for an apparatus 1700 employing a finite state machine 710 to optimize VGPIO latency. In some examples, the apparatus 1700 may configure the operation of the finite state machine 710. In some examples, the apparatus 1700 may perform one or more functions disclosed herein. In accordance with various aspects of the disclosure, an element, or any portion of an element, or any combination of elements as disclosed herein may be implemented using a processing circuit 1702. The processing circuit 1702 may include one or more processors 1704 that are controlled by some combination of hardware and software modules. Examples of processors 1704 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. Storage 1706 may include memory devices and mass storage devices, and may be referred to herein as computer-readable media and/or processor-readable media. The bus 1710 may also link various other circuits such as timing sources, timers, peripherals, voltage regulators, and power management circuits. A bus interface 1708 may provide an interface between the bus 1710 and one or more transceivers 1712a, 1712b. A transceiver 1712a, 1712b may be provided for each networking technology supported by the processing circuit. In some instances, multiple networking technologies may share some or all of the circuitry or processing modules found in a transceiver 1712a, 1712b. Each transceiver 1712a, 1712b provides a means for communicating with various other apparatus over a transmission medium. In one example, a transceiver 1712a may be used to couple the apparatus 1700 to a multi-wire bus. In another example, a transceiver 1712b may be used to connect the apparatus 1700 to a wireless network. Depending upon the nature of the apparatus 1700, a user interface 1718 (e.g., keypad, display, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a computer-readable medium that may include the storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external computer-readable medium. The external computer-readable medium and/or storage 1706 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1706 may also include, by way of example, a carrier wave, a transmission line, and any other suitable medium for transmitting software and/or instructions that may be accessed and read by a computer. Computer-readable medium and/or the storage 1706 may reside in the processing circuit 1702, in the processor 1704, external to the processing circuit 1702, or be distributed across multiple entities including the processing circuit 1702. The computer-readable medium and/or storage 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as a transceiver 1712a, 1712b, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to the transceiver 1712a, 1712b, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712a, 1712b, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

Methods for optimizing VGPIO latency may include an act of parsing various input sources including sources of GPIO signal state, parameters and/or messages to be transmitted. The input sources may include hardware events, configuration data, mask parameters, and register addresses. Packet-specific latency estimators may be employed to estimate the latency for corresponding packet types based upon the parsed parameters. A packet type to be used for transmission may be selected based on the minimum latency calculated or determined for available packet types. The selected packet type may be identified using a command code, which may be provided to a packetizer with a payload to be transmitted. The command code may also reflect a protocol to be used to transmit the payload. In some implementations, the physical link used to transmit the payload may be operated according to different protocols or different variants of one or more protocols. The protocol to be used for transmitting the payload may be selected based on latencies associated with the various available protocols or variants of protocols.

Figure 18:
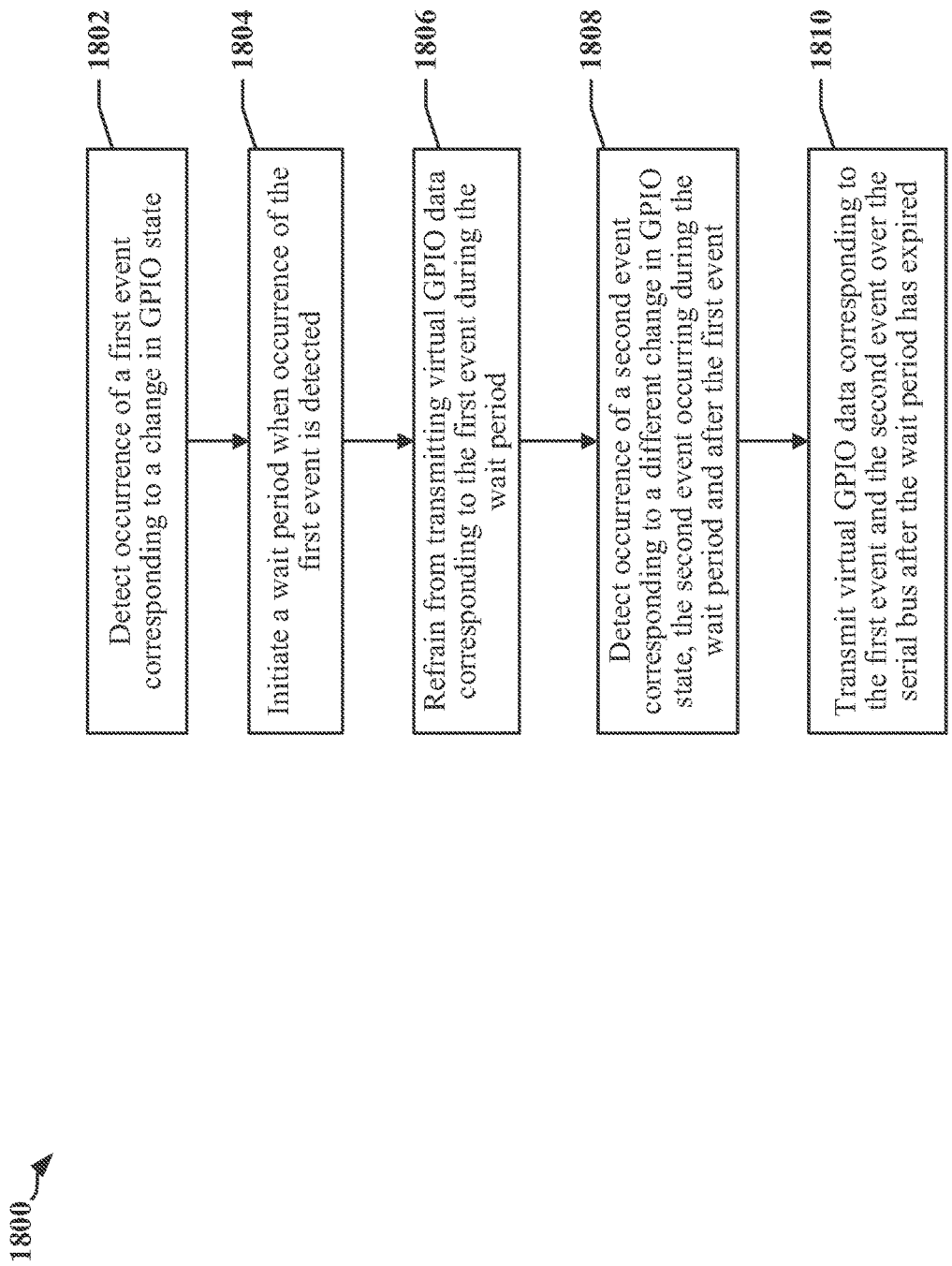
FIG. 18 is a flowchart illustrating certain operations of an application processor adapted in accordance with certain aspects disclosed herein.

FIG. 18 is a flowchart 1800 of a method that may be performed at a device coupled to a communication link Portions of the method may be performed by a finite state machine in the device.

At block 1802, the finite state machine may detect occurrence of a first event corresponding to a change in GPIO state.

At block 1804, the finite state machine may initiate a wait period when occurrence of the first event is detected.

At block 1806, the finite state machine may refrain from transmitting VGPIO data corresponding to the first event during the wait period. Refraining from transmitting the VGPIO data may include foregoing an opportunity to transmit the VGPIO data during the wait period. The communication link may be idle during at least a portion of the wait period.

At block 1808, the finite state machine may detect occurrence of a second event corresponding to a different change in GPIO state. The second event may occur during the wait period and after the first event.

At block 1810, the finite state machine may transmit VGPIO data corresponding to the first event and the second event over the communication link after the wait period has expired.

In some instances, example, the wait period may be terminated when occurrence of the second event is detected. For example, the second event may be identified as a high-priority event, or an event to be transmitted with low latency. The VGPIO data corresponding to the first event and the second event may be transmitted over the communication link after the wait period is terminated.

In certain examples, the wait period is defined by a counter, and the finite state machine may cause the counter to load a first delay value when the first event is detected. The wait period may be initiated when the counter is loaded with the first delay value. The finite state machine may cause the counter to load a second delay value when the second event is detected. The wait period may be restarted when the counter is loaded with the second delay value. In some examples, the first delay value equals the second delay value. In other examples, the first delay value is different from the second delay value. The finite state machine may select the first delay value based on identity of a first VGPIO bit associated with the change in state of a physical GPIO pin that generated the first event. The finite state machine may select the second delay value based on identity of a second VGPIO bit associated with the change in state of a physical GPIO pin that generated the second event. The value of each of the first delay value and the second delay value may reflect a priority assigned to a corresponding physical GPIO pin. The values selected as the first delay value and the second delay value may reflect relative priorities assigned to corresponding physical GPIO pins. In some instances, the second delay value causes the wait period to be terminated when the second delay value is loaded.

In some examples, the finite state machine may detect occurrence of a third event corresponding to a different change in GPIO state. The third event may occur during the wait period and after the second event. The finite state machine may transmit VGPIO data corresponding to the third event with the VGPIO data corresponding to the first event and the second event after the wait period has expired.

In one example, the finite state machine may terminate the wait period after a maximum duration has expired. The maximum period may commence when the occurrence of the first event is detected. The maximum period may be tracked using a counter or timer.

The communication link may include a serial link that is operated in accordance with an I2C protocol and/or in accordance with a MIPI defined protocol such as the I3C, the SPMI, or RFFE protocol. In some implementations, the communication link may provide a VGMI.

Figure 19:
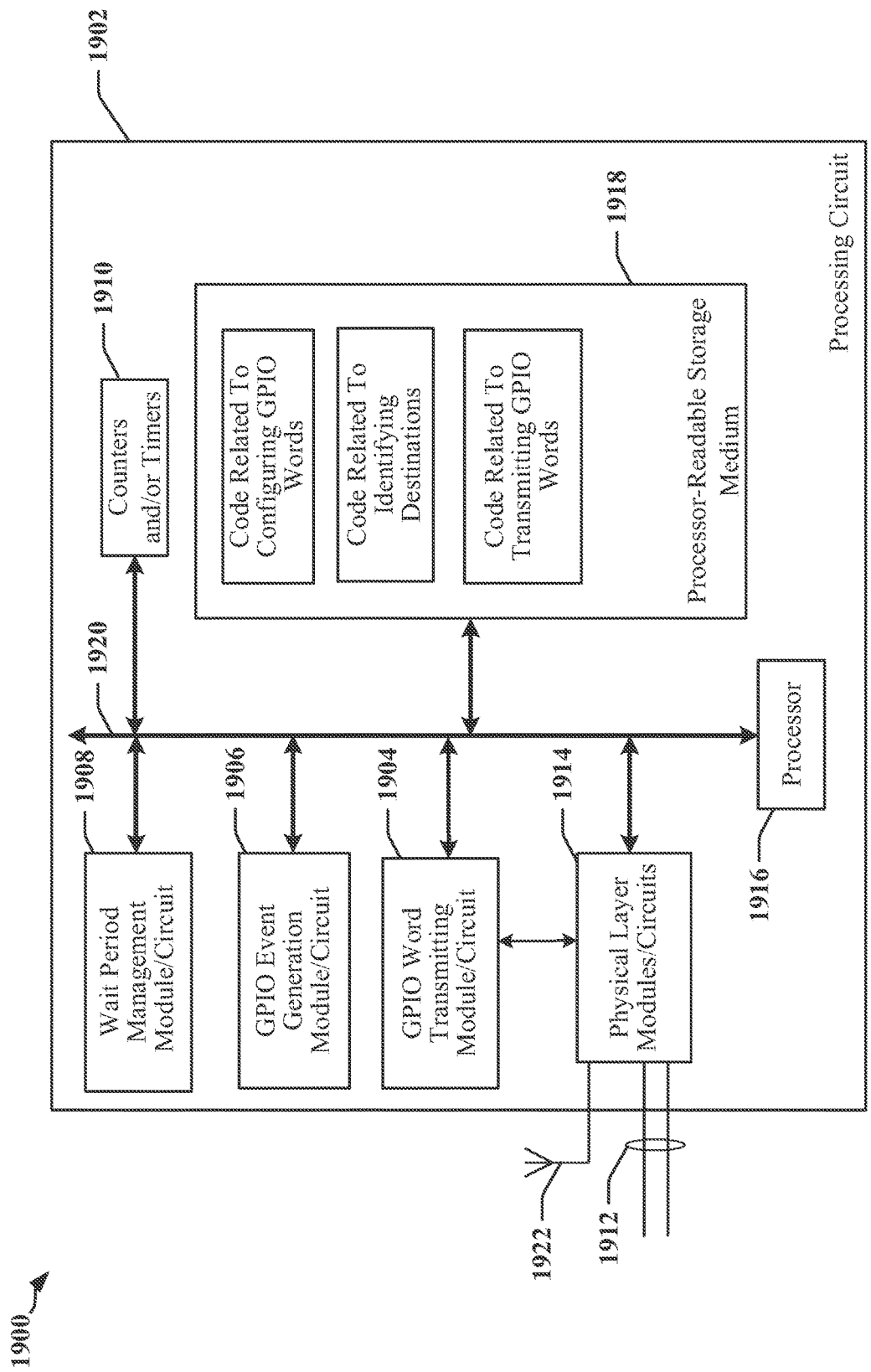
FIG. 19 illustrates an example of a hardware implementation for an apparatus adapted in accordance with certain aspects disclosed herein.

FIG. 19 is a diagram illustrating a simplified example of a hardware implementation for an apparatus 1900 employing a processing circuit 1902. The apparatus may implement a bridging circuit in accordance with certain aspects disclosed herein. The processing circuit typically has a controller or processor 1916 that may include one or more microprocessors, microcontrollers, digital signal processors, sequencers and/or state machines. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors and/or hardware modules, represented by the controller or processor 1916, the modules or circuits 1904, 1906 and 1908, and the processor-readable storage medium 1918. One or more physical layer circuits and/or modules 1914 may be provided to support communications over a communication link implemented using a multi-wire bus 1912, through an antenna 1922 (to a wireless network for example), and so on. The bus 1920 may also link various other circuits such as timing sources, peripherals, voltage regulators, and power management circuits, which are well known in the art, and therefore, will not be described any further.

The processor 1916 is responsible for general processing, including the execution of software, code and/or instructions stored on the processor-readable storage medium 1918. The processor-readable storage medium may include a non-transitory storage medium. The software, when executed by the processor 1916, causes the processing circuit 1902 to perform the various functions described supra for any particular apparatus. The processor-readable storage medium may be used for storing data that is manipulated by the processor 1916 when executing software. The processing circuit 1902 further includes at least one of the modules 1904, 1906 and 1908. The modules 1904, 1906 and 1908 may be software modules running in the processor 1916, resident/stored in the processor-readable storage medium 1918, one or more hardware modules coupled to the processor 1916, or some combination thereof. The modules 1904, 1906 and 1908 may include microcontroller instructions, state machine configuration parameters, or some combination thereof.

In one configuration, the apparatus 1900 includes a module and/or circuit 1906 configured to detect occurrence of events corresponding to a change in GPIO state, modules and/or circuits 1908, 1910 configured to manage a wait state initiated after occurrence of a first event, and modules and/or circuits 1904, 1914 configured to transmit a packet that includes VGPIO data corresponding to one or more events after the wait period has expired.

In another configuration, the apparatus 1900 is coupled to a multi-wire bus 1912 and includes a module and/or circuit 1906 for detecting events, which is configured to detect occurrence of a first event corresponding to a change in GPIO state, and a second event corresponding to a different change in GPIO state, the second event occurring after the first event, a module and/or circuit 1908 for providing a wait period configured to initiate the wait period when occurrence of the first event is detected. The second event may occur during the wait period. The apparatus 1900 may include modules and/or circuits 1904, 1914 for transmitting data over the multi-wire bus 1912. The modules and/or circuits 1904, 1914 for transmitting data may be configured to refrain from transmitting VGPIO data corresponding to the first event during the wait period, and to transmit VGPIO data corresponding to the first event and the second event over the multi-wire bus 1912 after the wait period has expired.

In one example, the modules and/or circuits 1904, 1914 for transmitting data over the multi-wire bus 1912 is configured to forego an opportunity to transmit the VGPIO data during the wait period. The multi-wire bus 1912 may be idle during at least a portion of the wait period.

In certain examples, the module and/or circuit 1908 for providing a wait period includes a counter. The module and/or circuit 1908 for providing a wait period may be configured to cause the counter to load a first delay value when the first event is detected. The wait period may be initiated when the counter is loaded with the first delay value. The module and/or circuit 1908 for providing a wait period may be configured to cause the counter to load a second delay value when the second event is detected. The wait period may be restarted when the counter is loaded with the second delay value. In one example, the first delay value equals the second delay value. In another example, the first delay value is different from the second delay value. The module and/or circuit 1908 for providing a wait period may be configured to select the first delay value based on identity of a first VGPIO bit associated with the change in state of a physical GPIO pin that generated the first event, and select the second delay value based on identity of a second VGPIO bit associated with the change in state of a physical GPIO pin that generated the second event. The values selected as the first delay value and the second delay value reflect relative priorities assigned to corresponding physical GPIO pins. The second delay value may cause the wait period to be terminated when the second delay value is loaded.

In one aspect, the module and/or circuit 1908 for providing a wait period may be configured to terminate the wait period after a maximum duration has expired, the maximum period commencing when occurrence of the first event is detected.

In one example, the communication link includes a serial bus operated in accordance with an I3C, SPMI, or RFFE protocol. In another example, the communication link includes a peer-to-peer VGPIO messaging interface.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method performed at a device coupled to a communication link, comprising:
   detecting occurrence of a first event corresponding to a change in general purpose input/output (GPIO) state;
   initiating a wait period when the occurrence of the first event is detected;
   refraining from transmitting virtual GPIO data corresponding to the first event during the wait period;
   detecting occurrence of a second event corresponding to a different change in GPIO state, the second event occurring during the wait period and after the first event; and
   transmitting virtual GPIO data corresponding to the first event and the second event over the communication link after the wait period has expired.

2. The method of claim 1, wherein refraining from transmitting the virtual GPIO data comprises:
   foregoing an opportunity to transmit the virtual GPIO data during the wait period.

3. The method of claim 1, wherein the communication link is idle during at least a portion of the wait period.

4. The method of claim 1, further comprising:
   terminating the wait period when the occurrence of the second event is detected, wherein the virtual GPIO data corresponding to the first event and the second event are transmitted over the communication link after the wait period is terminated.

5. The method of claim 1, wherein the wait period is defined by a counter, further comprising:
   causing the counter to load a first delay value when the first event is detected, wherein the wait period is initiated when the counter is loaded with the first delay value; and
   causing the counter to load a second delay value when the second event is detected, wherein the wait period is restarted when the counter is loaded with the second delay value.

6. The method of claim 5, wherein the first delay value equals the second delay value.

7. The method of claim 5, wherein the first delay value is different from the second delay value.

8. The method of claim 5, further comprising:
   selecting the first delay value based on identity of a first virtual GPIO bit associated with a change in state of a physical GPIO pin that generated the first event; and
   selecting the second delay value based on identity of a second virtual GPIO bit associated with a change in state of a physical GPIO pin that generated the second event,
   wherein values selected as the first delay value and the second delay value reflect relative priorities assigned to corresponding physical GPIO pins.

9. The method of claim 8, wherein the second delay value causes the wait period to be terminated when the second delay value is loaded.

10. The method of claim 1, further comprising:
    detecting occurrence of a third event corresponding to a different change in GPIO state, the third event occurring during the wait period and after the second event; and
    transmitting virtual GPIO data corresponding to the third event with the virtual GPIO data corresponding to the first event and the second event after the wait period has expired.

11. The method of claim 1, further comprising:
    terminating the wait period after a maximum duration has expired, the maximum duration commencing when the occurrence of the first event is detected.

12. The method of claim 1, wherein the communication link comprises a serial bus operated in accordance with an I3C, system power management interface (SPMI), or Radio Frequency Front-End (RFFE) protocol.

13. The method of claim 1, wherein the communication link comprises a virtual GPIO messaging interface (VGMI).

14. A device coupled to a communication link, comprising:
- a physical layer circuit that couples the device to the communication link;
- a finite state machine configured to detect occurrence of a first event corresponding to a change in general purpose input/output (GPIO) state, and occurrence of a second event corresponding to a different change in GPIO state, the second event occurring after the first event; and
- a timing circuit configured to initiate a wait period when the occurrence of the first event is detected,
- wherein the finite state machine is further configured to:
  - constrain the physical layer circuit from transmitting virtual GPIO data corresponding to the first event during the wait period;
  - cause the physical layer circuit to transmit the virtual GPIO data corresponding to the first event; and
  - cause the physical layer circuit to transmit virtual GPIO data corresponding to the second event over the communication link after the wait period has expired when the second event occurs during the wait period.

15. The device of claim 14, wherein the finite state machine is further configured to:
- forego an opportunity to transmit the virtual GPIO data during the wait period.

16. The device of claim 14, wherein the communication link is idle during at least a portion of the wait period.

17. The device of claim 14, wherein the finite state machine or the timing circuit is further configured to:
- terminate the wait period when the occurrence of the second event is detected, wherein the virtual GPIO data corresponding to the first event and the second event are transmitted over the communication link after the wait period is terminated.

18. The device of claim 14, wherein the wait period is defined by a counter and the timing circuit is further configured to:
- cause the counter to load a first delay value when the first event is detected, wherein the wait period is initiated when the counter is loaded with the first delay value; and
- cause the counter to load a second delay value when the second event is detected, wherein the wait period is restarted when the counter is loaded with the second delay value.

19. The device of claim 18, wherein the first delay value equals the second delay value.

20. The device of claim 18, wherein the first delay value is different from the second delay value.

21. The device of claim 18, wherein the timing circuit is further configured to:
- select the first delay value based on identity of a first virtual GPIO bit associated with a change in state of a physical GPIO pin that generated the first event; and
- select the second delay value based on identity of a second virtual GPIO bit associated with a change in state of a physical GPIO pin that generated the second event,
- wherein values selected as the first delay value and the second delay value reflect relative priorities assigned to corresponding physical GPIO pins.

22. The device of claim 21, wherein the second delay value causes the wait period to be terminated when the second delay value is loaded.

23. The device of claim 14, wherein the timing circuit is further configured to:
- terminate the wait period after a maximum duration has expired, the maximum duration commencing when the occurrence of the first event is detected.

24. The device of claim 14, wherein the communication link comprises a serial bus operated in accordance with an I3C, system power management interface (SPMI), or Radio Frequency Front-End (RFFE) protocol.

25. The device of claim 14, wherein the communication link comprises a virtual GPIO messaging interface (VGMI).

26. A device coupled to a communication link, comprising:
- means for detecting occurrences of events, including occurrence of a first event corresponding to a change in general purpose input/output (GPIO) state, and occurrence of a second event corresponding to a different change in GPIO state, the second event occurring after the first event;
- means for providing a wait period configured to initiate the wait period when the occurrence of the first event is detected, wherein the second event occurs during the wait period; and
- means for transmitting data over the communication link, wherein the means for transmitting data is configured to refrain from transmitting virtual GPIO data corresponding to the first event during the wait period, and to transmit virtual GPIO data corresponding to the first event and the second event over the communication link after the wait period has expired.

27. A non-transitory storage medium comprising instructions that, when executed by one or more processors, cause the one or more processors to:
- detect occurrence of a first event corresponding to a change in general purpose input/output (GPIO) state in a device coupled to a communication link;
- initiate a wait period when the occurrence of the first event is detected;
- refrain from transmitting virtual GPIO data corresponding to the first event during the wait period, wherein refraining from transmitting the virtual GPIO data includes foregoing an opportunity to transmit the virtual GPIO data during the wait period, and wherein the communication link is idle during at least a portion of the wait period;
- detect occurrence of a second event corresponding to a different change in GPIO state, the second event occurring during the wait period and after the first event; and
- transmit virtual GPIO data corresponding to the first event and the second event over the communication link after the wait period has expired.

28. The storage medium of claim 27, wherein the instructions further cause the one or more processors to:
- terminate the wait period when the occurrence of the second event is detected, wherein the virtual GPIO data corresponding to the first event and the second event are transmitted over the communication link after the wait period is terminated.

29. The storage medium of claim 27, wherein the instructions further cause the one or more processors to:
- initiate the wait period by loading a first delay value into a counter when the first event is detected; and
- cause the counter to load a second delay value when the second event is detected, wherein the wait period is restarted when the counter is loaded with the second delay value.

30. The storage medium of claim 29, wherein the first delay value equals the second delay value.

\* \* \* \* \*